United States Patent
Shi

(10) Patent No.: US 12,193,018 B2
(45) Date of Patent: Jan. 7, 2025

(54) METHOD AND DEVICE BASED ON DUPLICATE DATA TRANSMISSION

(71) Applicant: GUANGDONG OPPO MOBILE TELECOMMUNICATIONS CORP., LTD., Guangdong (CN)

(72) Inventor: Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 448 days.

(21) Appl. No.: 17/570,588

(22) Filed: Jan. 7, 2022

(65) Prior Publication Data
US 2022/0132559 A1    Apr. 28, 2022

Related U.S. Application Data

(63) Continuation of application No. PCT/CN2019/098041, filed on Jul. 26, 2019.

(51) Int. Cl.
*H04W 72/23* (2023.01)
*H04W 72/0453* (2023.01)
*H04W 72/51* (2023.01)

(52) U.S. Cl.
CPC ....... *H04W 72/23* (2023.01); *H04W 72/0453* (2013.01); *H04W 72/51* (2023.01)

(58) Field of Classification Search
CPC . H04W 72/23; H04W 72/0453; H04W 72/51; H04L 5/0044; H04L 5/0053; H04L 5/00; H04L 5/0098
See application file for complete search history.

(56) References Cited

U.S. PATENT DOCUMENTS

| | | | |
|---|---|---|---|
| 2016/0021646 A1 | 1/2016 | Hu et al. | |
| 2018/0368107 A1 | 12/2018 | Babaei et al. | |
| 2021/0037595 A1* | 2/2021 | Jin | H04W 76/27 |
| 2021/0227573 A1* | 7/2021 | Fröberg Olsson | H04W 72/23 |
| 2022/0015130 A1* | 1/2022 | Wang | H04W 72/02 |

(Continued)

FOREIGN PATENT DOCUMENTS

| | | |
|---|---|---|
| CN | 108632809 A | 10/2018 |
| CN | 108737045 A | 11/2018 |

(Continued)

OTHER PUBLICATIONS

3GPP TSG-RAN WG2 #99; Tdoc R2-1709474; Source: Ericsson; Title: Logical channel prioritization and transmission profiles; Berlin, Germany, Aug. 21-25, 2017 (Year: 2017).*

(Continued)

*Primary Examiner* — Mohammed S Chowdhury
(74) *Attorney, Agent, or Firm* — PERKINS COIE LLP

(57) ABSTRACT

Provided are a method and device based on duplicate data transmission, still capable of effectively utilizing uplink resources for data transmission when the state of the duplicate data transmission changes. The method includes: a terminal device receives uplink grant information; the terminal device receives first indication information, the first indication information being used for indicating whether data of at least one logical channel of the terminal device can be transmitted using the uplink resources indicated by the uplink grant information.

9 Claims, 9 Drawing Sheets

(56) References Cited

U.S. PATENT DOCUMENTS

2022/0070914 A1* 3/2022 Zhao ............... H04L 5/0044
2022/0174687 A1* 6/2022 Kuo ............... H04W 72/56

FOREIGN PATENT DOCUMENTS

| CN | 108809594 A | 11/2018 |
|---|---|---|
| CN | 109691170 A | 4/2019 |
| CN | 110022608 A | 7/2019 |
| EP | 3618553 A1 | 3/2020 |
| WO | 2019024120 A1 | 2/2019 |
| WO | 2019028848 A1 | 2/2019 |

OTHER PUBLICATIONS

3GPP TSG-RAN WG1 #96; R1-1903818; Source: Nokia, Nokia Shanghai Bell; Title: Summary of Friday offline discussion on UL/DL intra-UE prioritization/multiplexing; Athens, Greece, Feb. 25-Mar. 1, 2019 (Year: 2019).*

3GPP TSG RAN WG2 #99; R2-1709127; Source: Samsung; Title: Modelling of Abstraction-based Approach with Profile/Index. Berlin, Germany, Aug. 21 to 25, 2017. (Year: 2017).*

3GPP TSG-RAN WG2 Meeting #103; R2-1813038; Source: Rapporteur; Title: Summary of offline 006—Clarification on LCH-to-cell restriction; Gothenburg, Sweden, Aug. 20-24, 2018. (Year: 2018).*

3GPP TS 38.321 V16.5.0, 3rd Generation Partnership Project; Technical Specification Group Radio Access Network; NR; Medium Access Control (MAC) protocol specification (Release 16), Jun. 2021, 156 pages.

3GPP TS 38.331 V16.5.0, 3rd Generation Partnership Project; Technical Specification Group Radio Access Network; NR; Radio Resource Control (RRC) protocol specification (Release 16), Jun. 2021, 956 pages.

International Search Report mailed Apr. 26, 2020 in Application No. PCT/CN2019/098041, 6 pages.

Oppo, The impact of duplication on MAC, 3GPP TSG RAN WG2#NR_AdHoc#2, R2-1706344, Qingdao, China, Jun. 27-29, 2017, 3 pages.

Mediatek Inc, Email Discussion [NR-AH2# 15][NR UP] on LCP, 3GPP TSG-RAN WG2 Meeting #99, R2-1709538 Berlin, Germany, Aug. 21-25, 2017, 15 pages.

Nokia, Nokia Shanghai Bell, New WID: Support of NR Industrial Internet of Things (Iot), 3GPP TSG RAN Meeting #83, RP-190728, Shenzhen, China, Mar. 18-21, 2019.

Extended European Search Report for European Application No. 19939933.8 issued Jun. 9, 2022. 8 pages.

ZTE et al. "Carrier selection and resource selection in SL CA" R1-1719654; 3GPP TSG RAN WG1 Meeting #91; Reno, USA; Nov. 27-Dec. 1, 2017. 4 pages.

Examination Report for European Application No. 19939933.8 issued Mar. 17, 2023. 4 pages.

First Office Action for Chinese Application No. 202210052711.8 issued Feb. 25, 2023. 14 pages with English translation.

Lenovo et al. "Cell restriction for CA duplication" R2-1906724; 3GPP TSG-RAN WG2 Meeting #106; Reno, USA; May 13-17, 2019. 2 pages.

ZTE et al. "Consideration on Enhancement of PDCP Duplication" R2-1906124; 3GPP TSG-RAN WG2 Meeting #106; Reno, USA; May 13-17, 2019. 4 pages.

Examination report for European application for No. 19939933.8 Issued Aug. 29, 2023, 5 Pages.

* cited by examiner

METHOD AND DEVICE BASED ON DUPLICATE DATA TRANSMISSION

CROSS-REFERENCE TO RELATED APPLICATION

The present application is a continuation application of International PCT Application No. PCT/CN2019/098041, filed on Jul. 26, 2019, the entire content of which is hereby incorporated by reference.

TECHNICAL FIELD

Implementations of the present disclosure relate to the field of communication, and more particularly, to a method and a device based on data duplication transmission.

BACKGROUND

In a Dual Connectivity (DC) scenario, multiple network nodes, such as a Master eNB (MN) and a Secondary eNB (SN), may serve a terminal device, and data duplication may be transmitted between multiple base stations and terminal devices.

In a Carrier Aggregation field (CA) scenario, a Packet Data Convergence Protocol (PDCP) may duplicate a PDCP Protocol Data Unit (PDU) into two copies, which are mapped to different Radio Link Control (RLC) entities and mapped to two different physical carriers through Media Access Control (MAC) entities, so as to achieve frequency diversity gain and improve reliability of data transmission.

Whether data duplication transmission of CA or data duplication transmission of DC, each logical channel is configured with a set of allowed serving cells or becomes a carrier allowed to be used. When a terminal device receives uplink grant information (UL grant), if a carrier allowed by a logical channel matches a carrier where uplink information indicated by the UL Grant information is located, the terminal device may send data of the logical channel to a network device through the uplink resource. However, when an activation/deactivation state of a logical channel changes, how to effectively utilize, by a terminal device, a carrier resource to transmit data of each logical channel becomes an urgent problem to be solved.

SUMMARY

The present disclosure provides a method and a device based on data duplication transmission, which can still effectively utilize a carrier resource to transmit data of each logical channel when an activation/deactivation state of a logical channel changes.

In a first aspect, there is provided a method based on data duplication transmission, which includes: a terminal device receives uplink grant information; and the terminal device receives first indication information, the first indication information being used for indicating whether data of at least one logical channel of the terminal device can be transmitted by using an uplink resource indicated by the uplink grant information.

In a second aspect, there is provided a method based on data duplication transmission, which includes: a terminal device receives first configuration information, wherein the first configuration information is used for indicating carriers allowed to be used by multiple logical channel sets corresponding to a bearer, wherein each logical channel set includes at least part of logical channels corresponding to the bearer; and according to the first configuration information, the terminal device determines a carrier allowed to be used by an activated or used logical channel in a logical channel set.

In a third aspect, there is provided a method based on data duplication transmission, which includes: a terminal device determines a carrier allowed to be used by at least one logical channel corresponding to a bearer when the number of activated logical channels corresponding to the bearer changes.

In a fourth aspect, there is provided a method based on data duplication transmission, which includes: a network device sends uplink grant information; and the network device sends first indication information, wherein the first indication information is used for indicating whether data of at least one logical channel of a terminal device can be transmitted by using an uplink resource indicated by the uplink grant information.

In a fifth aspect, there is provided a method based on data duplication transmission, which includes: a network device sends first configuration information, wherein the first configuration information is used to indicate carriers allowed to be used by multiple logical channel sets corresponding to a bearer of a terminal device, wherein each logical channel set includes at least part of logical channels corresponding to the bearer.

In a sixth aspect, there is provided a method based on data duplication transmission, which includes: a network device sends second indication information, wherein the second indication information is used to indicate a terminal device to determine a carrier allowed to be used by at least one logical channel corresponding to a bearer when the number of activated logical channels corresponding to the bearer changes.

In a seventh aspect, a terminal device is provided, which is configured to perform the method in the first aspect or any optional implementation of the first aspect. Specifically, the terminal device includes function modules configured to perform the method in the first aspect or any possible implementation of the first aspect.

In an eighth aspect, a terminal device is provided, which is configured to perform the method in the second aspect or any optional implementation of the second aspect. Specifically, the terminal device includes function modules configured to perform the method in the second aspect or any possible implementation of the second aspect.

In a ninth aspect, a terminal device is provided, which is configured to perform the method in the third aspect or any optional implementation of the third aspect. Specifically, the terminal device includes function modules used for implementing the method in the third aspect or any possible implementation of the third aspect.

In a tenth aspect, a network device is provided, which is configured to perform the method in the fourth aspect or any optional implementation of the fourth aspect. Specifically, the network device includes function modules configured to perform the method in the fourth aspect or any possible implementation of the fourth aspect.

In an eleventh aspect, a network device is provided, which is configured to perform the method in the fifth aspect or any optional implementation of the fifth aspect. Specifically, the network device includes function modules configured to perform the method in the fifth aspect or any possible implementation of the fifth aspect.

In a twelfth aspect, a network device is provided, which may perform the method in the sixth aspect or any optional implementation of the sixth aspect. Specifically, the network device includes function modules configured to perform the method in the sixth aspect or any possible implementation of the sixth aspect.

In a thirteenth aspect, a terminal device is provided, including a processor and a memory. The memory is configured to store a computer program, and the processor is configured to call and run the computer program stored in the memory to perform the method in the first aspect or in any possible implementation of the first aspect, or perform the method in the second aspect or in any possible implementation of the second aspect, or perform the method in the third aspect or in any possible implementation of the third aspect.

In a fourteenth aspect, a network device is provided, including a processor and a memory. The memory is configured to store a computer program, and the processor is configured to call and run the computer program stored in the memory to perform the method in the fourth aspect or in any possible implementation of the fourth aspect, or perform the method in the fifth aspect or in any possible implementation of the fifth aspect, or perform the method in the sixth aspect or in any possible implementation of the sixth aspect.

In a fifteenth aspect, there is provided a chip, which includes a processor configured to call and run a computer program from a memory, enabling a device installed with the chip to perform the method in the first aspect or in any possible implementation of the first aspect, or perform the method in the second aspect or in any possible implementation of the second aspect, or perform the method in the third aspect or in any possible implementation of the third aspect.

In a sixteenth aspect, there is provided a chip, which includes a processor configured to call and run a computer program from a memory, enabling a device installed with the chip to perform the method in the fourth aspect or in any possible implementation of the fourth aspect, or perform the method in the fifth aspect or in any possible implementation of the fifth aspect, or perform the method in the sixth aspect or in any possible implementation of the sixth aspect.

In a seventeenth aspect, there is provided a computer readable storage medium for storing a computer program that enables a computer to perform the method in the first aspect or in any possible implementation of the first aspect, or perform the method in the second aspect or in any possible implementation of the second aspect, or perform the method in the third aspect or in any possible implementation of the third aspect.

In an eighteenth aspect, there is provided a computer readable storage medium for storing a computer program that enables a computer to perform the method in the fourth aspect or in any possible implementation of the fourth aspect, or perform the method in the fifth aspect or in any possible implementation of the fifth aspect, or perform the method in the sixth aspect or in any possible implementation of the sixth aspect.

In a nineteenth aspect, there is provided a computer program product including computer program instructions that enable a computer to perform the method in the first aspect or in any possible implementation of the first aspect, or perform the method in the second aspect or in any possible implementation of the second aspect, or perform the method in the third aspect or in any possible implementation of the third aspect.

In a twentieth aspect, there is provided a computer program product including computer program instructions that enable a computer to perform the method in the fourth aspect or in any possible implementation of the fourth aspect, or perform the method in the fifth aspect or in any possible implementation of the fifth aspect, or perform the method in the sixth aspect or in any possible implementation of the sixth aspect.

In a twenty-first aspect, there is provided a computer program which, when runs on a computer, enables the computer to perform the method in the first aspect or in any possible implementation of the first aspect, or perform the method in the second aspect or in any possible implementation of the second aspect, or perform the method in the third aspect or in any possible implementation of the third aspect.

In a twenty-second aspect, there is provided a computer program which, when runs on a computer, enables the computer to perform the method in the fourth aspect or in any possible implementation of the fourth aspect, or perform the method in the fifth aspect or in any possible implementation of the fifth aspect, or perform the method in the sixth aspect or in any possible implementation of the sixth aspect.

In a twenty-third aspect, a communication system is provided, which includes a terminal device and a network device.

The network device is configured to send uplink grant information; and send first indication information.

The terminal device is configured to receive uplink grant information; and receive first indication information.

The first indication information is used to indicate whether data of at least one logical channel of the terminal device can be transmitted using an uplink resource indicated by the uplink grant information.

In a twenty-fourth aspect, a communication system is provided, which includes a terminal device and a network device.

The network device is configured to send first configuration information.

The terminal device is configured to receive first configuration information; and according to the first configuration information, determine a carrier allowed to be used by an activated or used logical channel in a logical channel set.

The first configuration information is used to indicate carriers allowed to be used by multiple logical channel sets corresponding to a bearer, wherein each logical channel set includes at least part of logical channels corresponding to the bearer.

In a twenty-fifth aspect, a communication system is provided, which includes a terminal device and a network device.

The network device is configured to send second indication information, wherein the second indication information is used to indicate a terminal device to determine a carrier allowed to be used by at least one logical channel corresponding to a bearer when the number of activated logical channels corresponding to the bearer changes.

The terminal device is configured to determine a carrier allowed to be used by at least one logical channel corresponding to a bearer when the number of activated logical channels corresponding to the bearer changes, according to the second indication information.

To sum up, a network device sends first indication information to a terminal device to indicate whether data of each activated logical channel can be transmitted using a current uplink resource, so that when an activation/deactivation state of a logical channel changes, a carrier resource can still be effectively used to transmit data of each logical channel.

Or, a network device respectively configures allowed carriers for multiple logical channel sets corresponding to a bearer of a terminal device, so that when logical channels in a logical channel set are activated or used, the terminal device can know carriers allowed to be used by these logical channels, so as to carry out data transmission.

Or, when the number of activated logical channels corresponding to a hearer changes, the terminal device may re-determine a carrier allowed to be used by at least one logical channel corresponding to the bearer according to a preset rule, thereby effectively completing data transmission.

DETAILED DESCRIPTION

Figure 1:
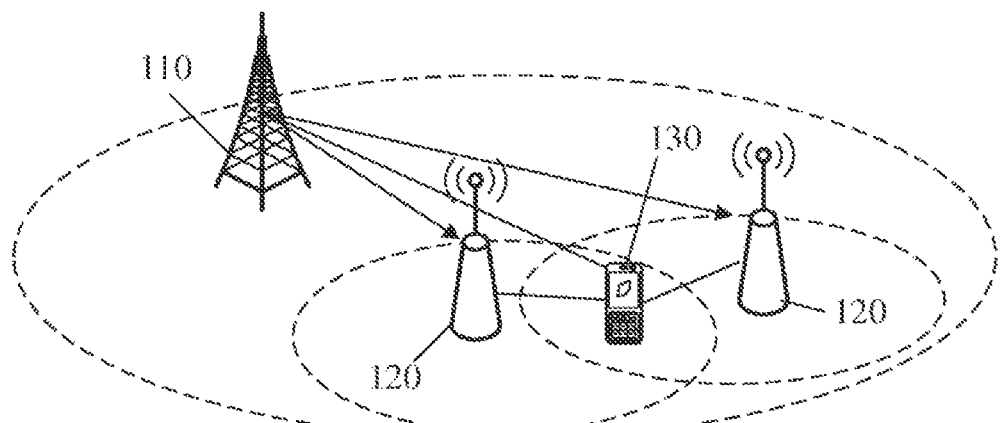
FIG. 1 is a schematic diagram of a possible wireless communication system applied in an implementation of the present disclosure.

In the following, technical solutions in implementations of the present disclosure will be described in combination with accompanying drawings of the implementations of the present disclosure.

The technical solutions of the implementations of the present disclosure may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), Wireless Local Area Networks (WLAN), Wireless Fidelity (WiFi), a future 5G system or other communication systems, etc.

Generally speaking, traditional communication systems support a limited number of connections and are easy to implement. However, with the development of communication technology, mobile communication systems will not only support traditional communications, but also support, for example, device to device (D2D) communication, machine to machine (M2M) communication, machine type communication (MTC), vehicle to vehicle (V2V) communication, etc., and the implementations of the present disclosure may also be applied to these communication systems.

A network device or network node in the implementations of the present disclosure may provide communication coverage for a specific geographical area, and may communicate with a terminal device (e.g., UE) within the coverage area. Optionally, the network device may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a future 5G network, or a network device in a future evolved Public Land Mobile Network (PLMN), etc.

A terminal device in the implementations of the present disclosure may be mobile or fixed. Optionally, the terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, a vehicle-mounted device, a wearable device, a terminal device in a future 5G network, or a terminal device in a future evolved Public Land Mobile Network (PLMN), or the like.

Optionally, a communication system in the implementations of the present disclosure may be applied to a Carrier Aggregation (CA) scenario and/or a Dual Connectivity (DC) scenario.

In a DC scenario, multiple Cell Groups (CGs) may serve a terminal device. The multiple CGs may include, for example, Master CGs (MCGs) or Secondary CGs (SCGs), which may be called master eNBs (MNs) or secondary eNBs (SNs). As shown in FIG. 1, network devices around a terminal device 130 in FIG. 1 include a master eNB 110 and at least one secondary eNB 120. The at least one secondary eNB 120 is respectively connected with the master eNB 110 to form multi-connectivity, and is respectively connected with the terminal device 130 to provide services for the terminal device 130.

The master eNB 110 may be an LTE network and the secondary eNB 120 may be an NR network. Or, the master eNB 110 may be an NR network and the secondary eNB 120 may be an LTE network. Or, both the master eNB 110 and the secondary eNB 120 are NR networks. In addition, the master eNB 110 may be a GSM base station, a CDMA base station, etc., and the secondary eNB 120 may be a GSM base station, a CDMA base station, etc., and neither the master eNB 110 nor the secondary eNB 120 is limited here.

The terminal device 130 may establish connections through the master eNB 110 and the secondary eNB 120 simultaneously. A connection established between the terminal device 130 and the master eNB 110 is a primary connection, and a connection established between the terminal device 130 and the secondary eNB 120 is a secondary connection. Control signaling of the terminal device 130 may be transmitted through the primary connection, while data of the terminal device may be transmitted through the primary connection and the secondary connection simultaneously, or may be transmitted through the secondary connection only.

Figure 2:
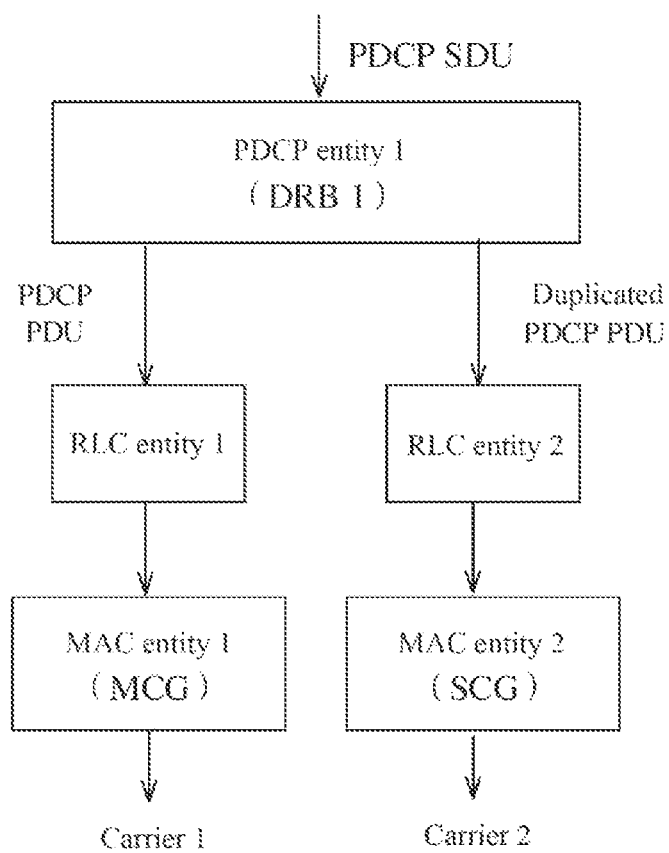
FIG. 2 is a schematic diagram of data duplication transmission under DC.

Data duplication may be transmitted between the master eNB and the secondary eNB, and the terminal device. A mode of data duplication transmission adopts a protocol architecture of DC or split bearer. For example, as shown in FIG. 2, a Packet Data Convergence Protocol (PDCP) entity 1 may duplicate a PDCP PDU into two identical copies, for example, one is PDCP PDU and the other one is duplicated PDCP PDU. Two PDCP PDUs are transmitted to a Media Access Control (MAC) entity 1 and a MAC entity 2 via a Radio Link Control (RLC) entity 1 and an RLC entity 2 respectively, and reach different CGs, namely an MCG and an SCG, via the MAC entity 1 and the MAC entity 2 respectively. Then they reach a MAC entity and an RLC entity corresponding to a terminal device (downlink) or a base station (uplink) through an air interface, and finally converge to a PDCP entity.

Figure 3:
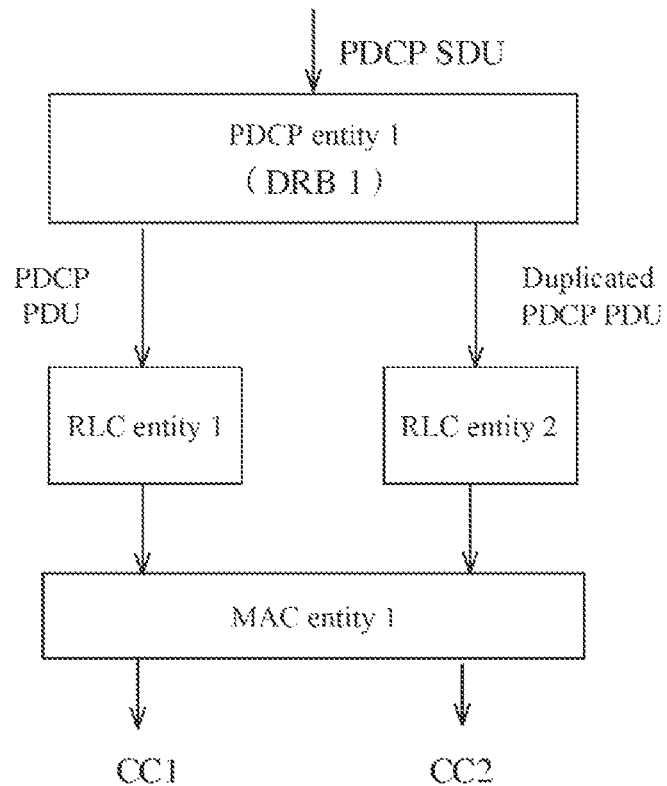
FIG. 3 is a schematic diagram of data duplication transmission under CA.

In a CA scenario, for example, as shown in FIG. 3, a PDCP Protocol Data Unit (PDU) may be duplicated by a PDCP entity 1 into two copies, mapped to an RLC entity 1 and an RLC entity 2 respectively, and mapped to two different Component Carriers (CCs) (also called carriers for short) through a MAC entity 1, so as to achieve frequency diversity gain and improve the reliability of data transmission.

Figure 4:
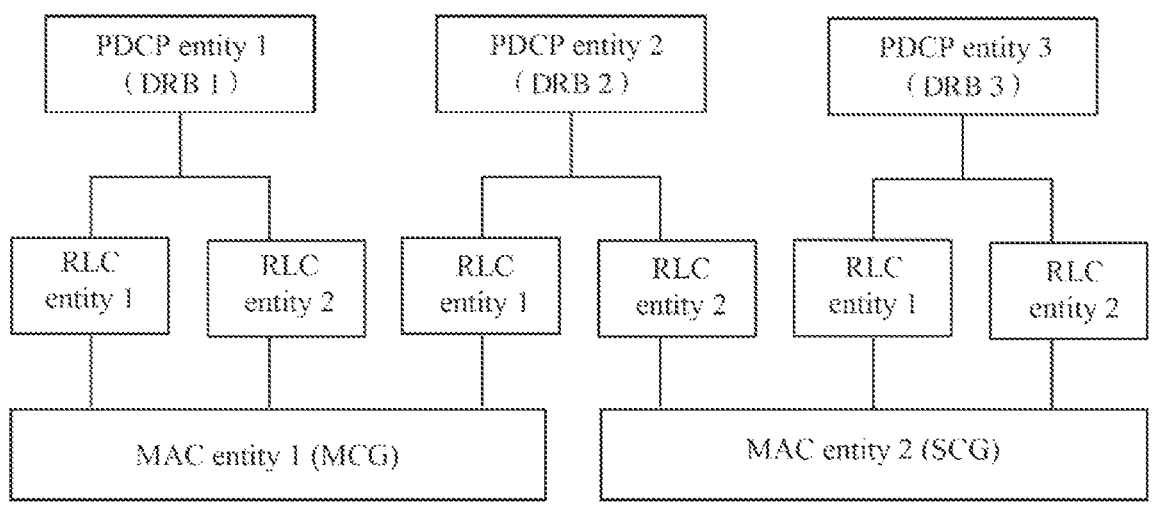
FIG. 4 is a schematic diagram of a possible architecture for data duplication transmission of a terminal device.

In an architecture of data duplication transmission shown in FIG. 4, data duplication transmission of DC and CA may be configured for one terminal device at the same time. Both an RLC entity 1 and an RLC entity 2 under a PDCP entity 1 correspond to a MAC entity 1, and both an RLC entity 1 and an RLC entity 2 under a PDCP entity 3 correspond to a MAC entity 2. While an RLC entity 1 and an RLC entity 2 under a PDCP entity 2 correspond to the MAC entity 1 and the MAC entity 2 respectively. The MAC entity 1 corresponds to an MCG and the MAC entity 2 corresponds to an SCG.

Data duplication is performed at a PDCP layer, and the same PDCP PDU is mapped to different RLC entities respectively. Data duplication transmission is also PDCP duplication transmission. A MAC layer needs to transmit data duplication of different RLC entities to different carriers. For a CA scenario, a solution of supporting data duplication transmission utilizes a function of data duplication transmission of a PDCP to transmit duplicated PDCP PDUs to two RLC entities respectively, that is, two different logical channels, and finally ensures that duplicated PDCP PDUs can be transmitted on aggregated carriers of different physical layers, thus achieving frequency diversity gain to improve reliability of data transmission, for example, Data Radio Bearer (DRB) 1 and DRB 3 in FIG. 4 as shown. In a DC scenario, a solution of supporting data duplication transmission utilizes a function of data duplication transmission of a PDCP to transmit duplicated PDCP PDUs to two RLC entities respectively, and the two RLC entities correspond to different MAC entities respectively, for example, DRB 1 and DRB 2 in FIG. 4 as shown.

Figure 5:
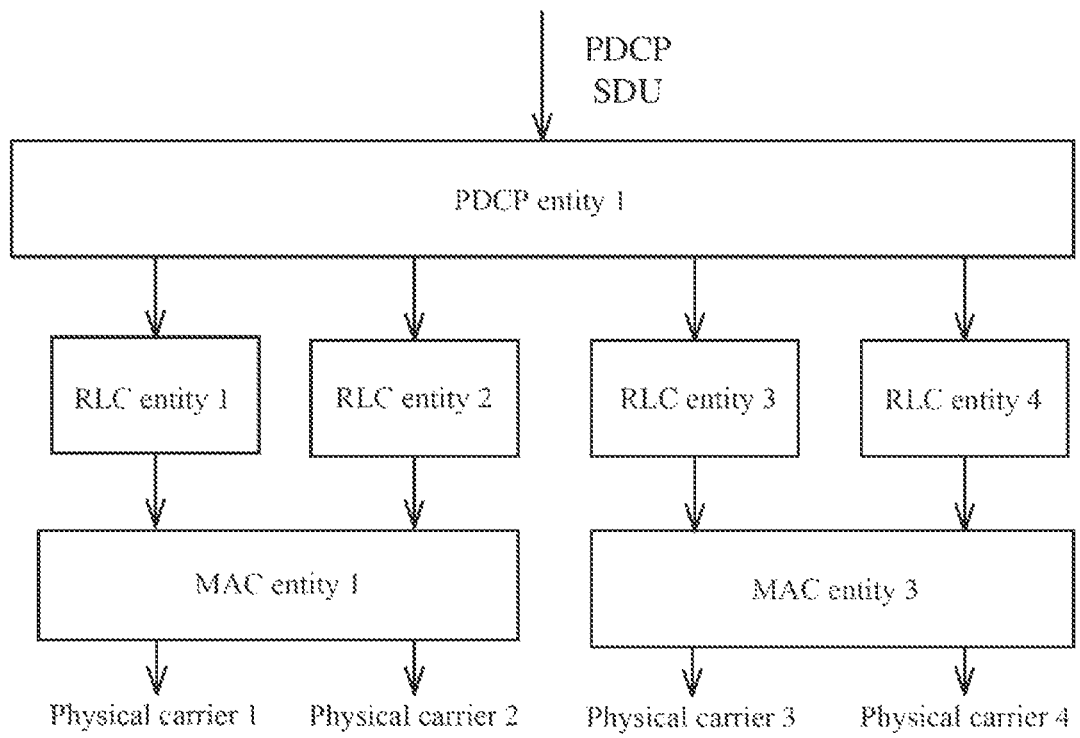
FIG. 5 is a schematic diagram of a possible architecture for data duplication transmission of a terminal device.

In order to make full use of data duplication in a Dual Connectivity (DC) scenario and a CA scenario to obtain higher resource utilization rate and reliability of data transmission, in an implementation of the present disclosure, the data duplication in the DC scenario and the CA scenario may be combined to introduce a mechanism for data duplication with more than two copies, that is, one PDCP entity may correspond to more than two RLC entities. For example, as shown in FIG. 5, it is assumed that a PDCP entity corresponds to four RLC entities, namely an RLC entity 1, an RLC entity 2, an RLC entity 3, and an RLC entity 4. The four RLC entities correspond to a logical channel 1, a logical channel 2, a logical channel 3, and a logical channel 4 respectively. A PDCP PDU obtained based on a PDCP Service Data Unit (SDU) may be transmitted through these four logical channels. The logical channel 2 is used to transmit a PDCP PDU, the logical channel 3 is used to transmit a duplicated PDCP PDU under DC, and the logical channels 1 and 4 are used to transmit a duplicated PDCP PDU under CA. The logical channels 1 and 2 are logical channels of an MCG, and the logical channels 3 and 4 are logical channels of an SCG. The duplicated PDCP PDU transmitted through the logical channel 1 and the PDCP PDU transmitted through the logical channel 2 are mapped to a physical carrier 1 and a physical carrier 2 through a MAC entity 1. The duplicated PDCP PDU transmitted through the logical channel 3 and the duplicated PDCP PDU transmitted through the logical channel 4 are mapped to a physical carrier 3 and a physical carrier 4 through a MAC entity 2. In this way, a duplicated PDCP PDU can be transmitted on four physical carriers, thus achieving higher resource utilization rate and reliability of data transmission.

At present, a concept of Logical Channel-to-Cell Restriction (LCH-to-Cell Restriction) is introduced for data duplication transmission of CA or DC, so that data on different Logical Channels (LCHs) can only be transmitted on specific carriers. For example, when configuring a logical channel, identifiers of serving cells allowed to be mapped or used (allowedServingCells) by the logical channel are configured. According to the identifiers, when a terminal device receives uplink grant (UL grant) information, it may determine whether data of a logical channel that currently has data to be transmitted may be transmitted on an uplink resource indicated by the uplink grant information according to an identifier of a carrier where the uplink grant information is located. The allowedServingCells configured for the logical channel in an implementation of the present disclosure are also carriers allowed to be used by the logical channel. If a configured carrier allowed to be used by the logical channel matches a carrier where the uplink resource is located, the data of the logical channel may be transmitted to a network by using the uplink resource. For each logical channel, only one set of carriers allowed to be used is configured.

However, when an activation/deactivation state of a logical channel changes, for example, when the number of activated logical channels increases or decreases, a terminal device cannot make better use of a carrier resource for data transmission.

An implementation of the present disclosure provides a solution based on data duplication transmission, which can still effectively utilize a carrier resource to transmit data of each logical channel when an activation/deactivation state of a logical channel changes, so as to ensure that services can be transmitted to a network device in time and with high quality.

Hereinafter, the activation/deactivation of the logical channel also refers to activation/deactivation of an RLC entity corresponding to the logical channel, and the carrier may refer to a cell, that is, a serving cell.

Figure 6:
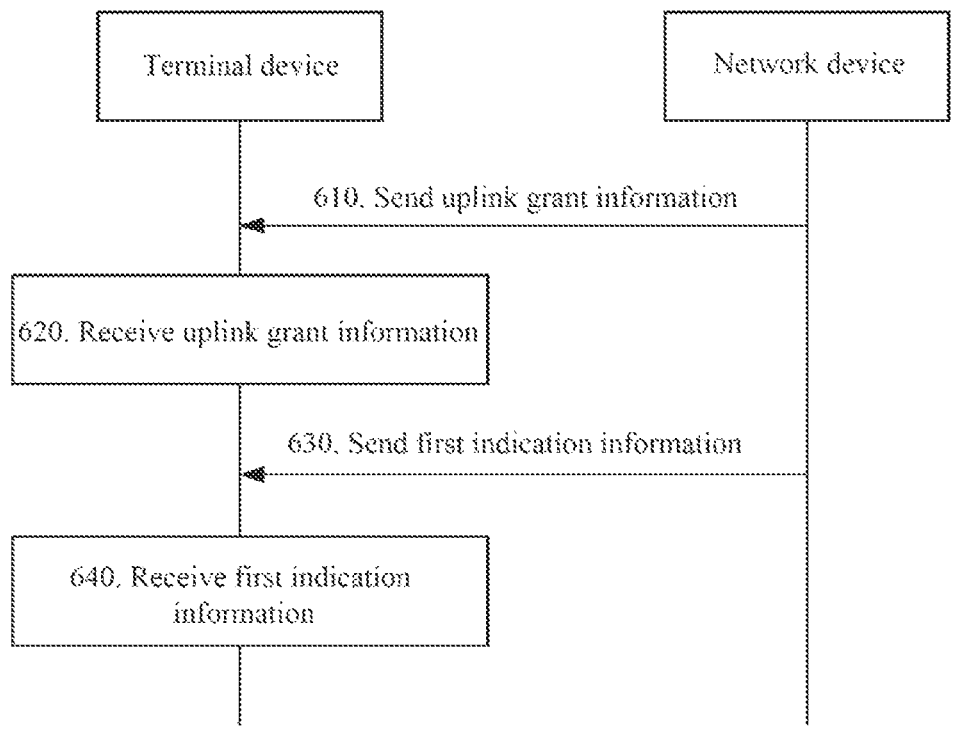
FIG. 6 is a flow interaction diagram of a method based on data duplication transmission according to an implementation of the present disclosure.

FIG. 6 is a flow interaction diagram of a method 600 based on data duplication transmission of an implementation of the present disclosure. The method may be performed by a terminal device and a network device. As shown in FIG. 6, the method 600 includes the following acts.

In act 610, a network device sends uplink grant information to a terminal device.

In act 620, a terminal device receives the uplink grant information sent by the network device.

The uplink grant information is used to indicate an uplink resource.

In act 630, the network device sends first indication information.

In act 640, the terminal device receives the first indication information sent by the network device.

The first indication information is used to indicate whether data of at least one logical channel of the terminal device can be transmitted using the uplink resource indicated by the uplink grant information.

In an implementation, a network device sends first indication information to a terminal device to indicate whether data of each logical channel currently configured or activated may be transmitted using an uplink resource (i.e. a UL-Shared CHannel (UL-SCH)) indicated by uplink grant information, so that when an activation/deactivation state of a logical channel changes, a carrier resource can still be effectively used to transmit data of each logical channel.

For example, the first indication information is used to indicate whether a logical channel corresponding to each bearer can use the uplink resource indicated by the uplink grant information; or is used to indicate whether a logical channel corresponding to each bearer used for data duplication transmission can use the uplink resource indicated by the uplink grant information. The uplink grant includes, for example, a CG and/or dynamic grant.

The first indication information may be carried in, for example, Download Control Information (DCI), an RRC message, or a Media Access Control Element (MAC CE).

The RRC message is, for example, RRC configuration information, such as Configured Grant configuration (Configured-Grantconfig) information.

The first indication information and the uplink grant information may be carried in the same message or in different messages.

For example, in Dynamic Grant (DG), both first indication information and uplink grant information may be carried in DCI. After receiving the DCI, a terminal device obtains an uplink resource indicated by the uplink grant information and first indication information, so as to determine whether data of a currently configured or activated logical channel can be transmitted to a network device by using the uplink resource scheduled by the DCI according to the first indication information.

For another example, in Configured. Grant (CG), both first indication information and uplink grant information may be carried in an RRC message, the RRC message carries an uplink resource configured by a network device for a terminal device and the first indication information. After receiving the RRC message, a terminal device obtains an uplink resource and first indication information, so as to determine whether data of a currently configured or activated logical channel can be transmitted to a network device by using the uplink resource according to the first indication information.

Or, in Configured Grant, uplink grant information may be carried in an RRC message, and first indication information may be carried in DCI, wherein the DCI is used to activate or deactivate an uplink resource indicated by the RRC message.

In acts 630 and 640, the first indication information is used to indicate a carrier allowed to be used by at least one logical channel of a terminal device, wherein the at least one logical channel is not limited by the present disclosure.

For example, the logical channel may be a logical channel corresponding to a bearer configured with or without a function of data duplication transmission, or a logical channel corresponding to a bearer with an activated or deactivated function of data duplication transmission.

For another example, the number of the at least one logical channel may be: the maximum number of logical channels supported by a bearer, that is, the maximum number of logical channels that may be supported by a bearer without being limited to the terminal device; or, the maximum number of logical channels supported by a bearer of the terminal device; or, the maximum number of logical channels corresponding to a bearer configured by a network device for the terminal device; or, the maximum number of logical channels corresponding to a bearer configured by a network device for the terminal device for data duplication transmission; or, the total number of logical channels corresponding to all bearers configured by the network device for the terminal device.

For another example, the number of the at least one logical channel is: the number of logical channels corresponding to all bearers associated with a cell group (CG) configured by a network device for the terminal device, for example, taking an MCG in FIG. 4 as an example, logical channels corresponding to all bearers associated with the MCG include an LCH 1 under a DRB 1 (an RIX entity 1 corresponding to the DRB 1), an LCH 2 under the DRB 1 (an RLC entity 2 corresponding to the DRB 1), an LCH 1 under a DRB 2 (an RLC entity corresponding to a DRB 2), and an LCH 2 under the DRB 2 (an RLC entity 2 corresponding to the DRB 2); or, the number of all logical channels under a CG configured by the network device for the terminal device, such as the total number of logical channels under an MCG or a total number of logical channels under an SCG, herein, taking an MCG in FIG. 4 as an example, all logical channels under the MCG include an LCH 1 under a DRB 1, an LCH 2 under the DRB 1, and an LCH 1 under a DRB 2; or, the maximum number of logical channels supported by the terminal device in a CG; or, the maximum number of logical channels corresponding to a bearer for data duplication transmission under a CG configured by the network device for the terminal device; or, the maximum number of logical channels corresponding to all bearers for data duplication transmission under a CG configured by the network device for the terminal device; or, the maximum number of logical channels under a CG configured by the network device for the terminal device, which is less than or equal to the maximum number of logical channels supported by the terminal device in a CG.

The bearer for data duplication transmission may refer to a bearer configured with a function of data duplication transmission, and/or a bearer with an activated function of data duplication transmission.

An implementation of the present disclosure does not limit the content and format of the first indication information. For example, a mode of indicating explicitly through a logical channel identifier or a mode of indicating through a bitmap may be adopted.

In a first implementation, the first indication information includes a logical channel identifier of a logical channel that can use the uplink resource to transmit data of the logical channel, or includes a logical channel identifier of a logical channel that cannot use the uplink resource to transmit data of the logical channel.

For example, if data on an LCH 1 and an LCH 2 in the LCH 1, the LCH 2, an LCH 3, and an LCH 4 under a DRB 1 may be transmitted using an uplink resource indicated by uplink grant information, the first indication information includes logical channel identifiers of the LCH 1 and the LCH 2. Further, a cell group identifier (cell group id) may also be included.

In a second implementation, the first indication information includes multiple bits, wherein each bit corresponds to one logical channel, and a value of each bit indicates whether data of a logical channel corresponding to each bit can be transmitted using the uplink resource.

The first indication information occupies multiple bits, or the first indication information is carried by multiple bits. When values on the bits are different, it is indicated respectively that data of logical channels corresponding to the bits can or cannot be transmitted using a carrier where the uplink resource is located.

For example, when a value of a bit is 1, it may be considered that data of a logical channel corresponding to the bit can be transmitted using the carrier where the uplink resource is located, and when a value of a bit is 0, it represents that data of a logical channel corresponding to the bit cannot be transmitted using the carrier where the uplink resource is located. For example, if data on an LCH 1 and an LCH 2 in the LCH 1, the LCH 2, an LCH 3, and an LCH 4 under a DRB 1 may be transmitted using an uplink resource indicated by uplink grant information, the first indication information may include four bits, wherein the four bits correspond to a logical channel 1 to a logical channel 4 from front to back in turn, and the 4 bits should be 1100.

The bitmap includes N bits, where N may be the maximum number of logical channels corresponding to one bearer configured by a network device, and the N bits may simultaneously indicate usage of carriers of various logical channels corresponding to multiple bearers. Or, N may be the maximum number of logical channels corresponding to one bearer configured by a network device for data duplication transmission, and the N bits may simultaneously indicate usage of carriers of various logical channels corresponding to multiple bearers with a configured or activated function of data duplication transmission. For example, N may be equal to the number of the at least one logical channel in acts 630 and 640.

Figure 7:
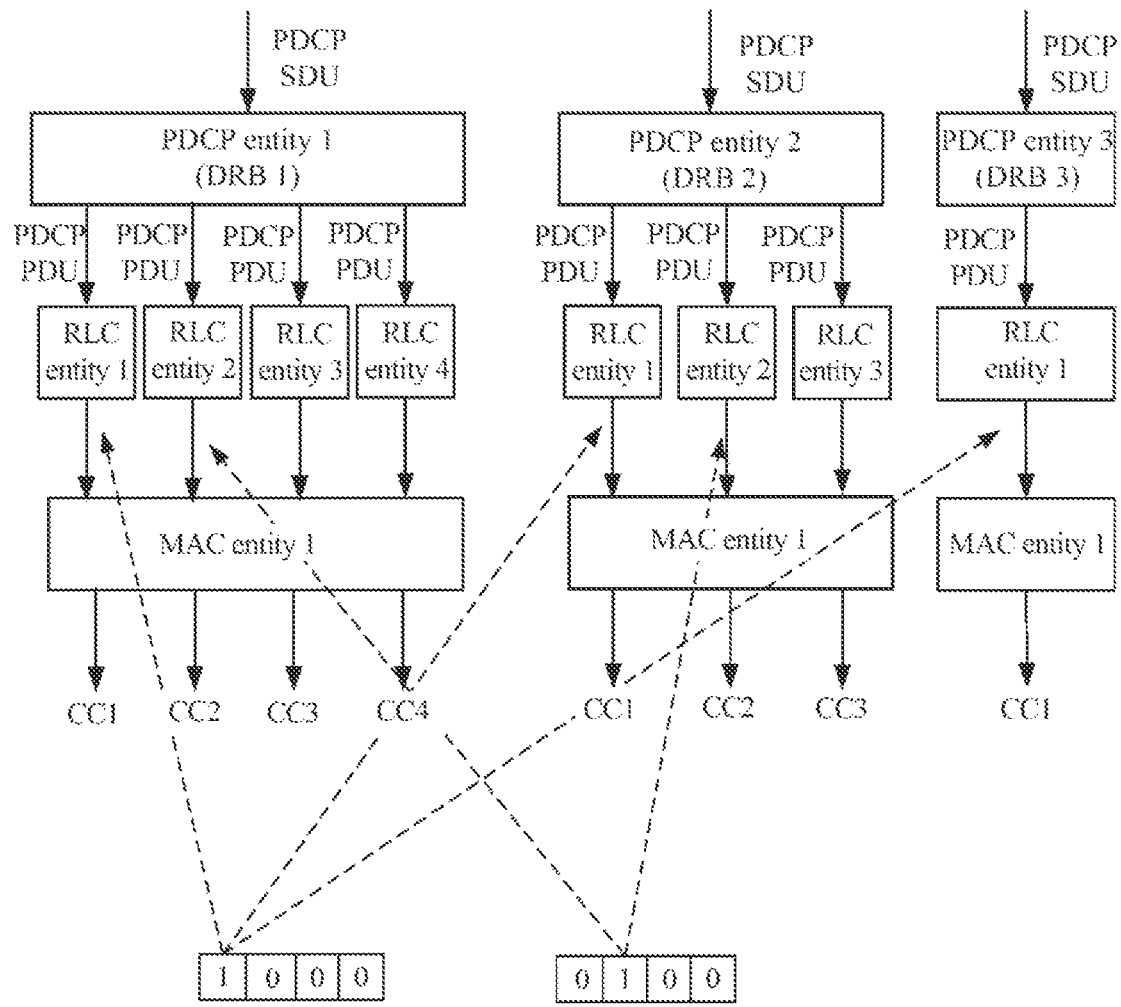
FIG. 7 is a schematic diagram of an implementation based on the method shown in FIG. 6.

For example, as shown in FIG. 7, in a DRB 1, a DRB 2, and a DRB 3, the number of logical channels configured for the DRB 1 is the largest, which is 4 logical channels, so N=4. When four bits are 1000, it represents that data of an LCH 1 of a DRB 1 (an RLC entity 1 corresponding to a DRB 1), an LCH 1 of a DRB 2 (an RLC entity 1 corresponding to a DRB 2), and an LCH 1 of a DRB 3 (an RLC entity 1 corresponding to a DRB 3) can be transmitted using a carrier where the uplink resource is located, while data of other logical channels cannot be transmitted using the carrier. When four bits are 0100, it represents that data on an LCH 2 of a DRB 1 (an RLC entity 2 corresponding to of a DRB 1) and an ICH 2 of a DRB 2 (an RLC entity 2 corresponding to a DRB 2) can be transmitted using a carrier where the uplink resource is located, while other logical channels cannot be transmitted using the carrier. Optionally, when four bits are 0100, because a DRB 3 is not configured with a function of data duplication transmission, or is configured with a function of data duplication transmission but the function is not activated, that is, an LCH 2 does not exist, it may be defaulted that data of the DRB 3 cannot be transmitted using the uplink resource.

As another example, in FIG. 7, N may be the maximum number of logical channels corresponding to one bearer configured by a network device for data duplication transmission. Since the DRB 1 and the DRB 2 shown in FIG. 7 are hearers with a configured or activated function of data duplication transmission, and the number of logical channels configured for the DRB 1 is the largest, which is 4 logical channels, N=4. When four bits are 1000, it represents that data of an LCH of a DRB 1 and data of an LCH 1 of a DRB 2 can be transmitted using a carrier where the uplink resource is located, while other logical channels cannot be transmitted using the carrier. When four bits are 0100, it represents that data of an LCH 2 of a DRB 1 and data of an LCH 2 of a DRB 2 can be transmitted using a carrier where the uplink resource is located, while data of other logical channels cannot be transmitted using the carrier.

In addition, optionally, the first indication information may be used to indicate whether data on an activated and/or used logical channel can be transmitted using the uplink resource, that is, it does not indicate whether a logical channel that is not activated can be used for transmitting using the uplink resource. For example, if an LCH 2 under a DRB 2 is not activated, a logical channel indicated by first indication information does not include the LCH 2.

Or, if a logical channel on a bearer is not activated, even if first indication information indicates that data of the logical channel can be transmitted using the uplink resource, the data of the logical channel will not be transmitted using the uplink resource. For example, if the LCH 2 of the DRB 2 shown in FIG. 7 is not activated, even if first indication information indicates that data of the LCH 2 may be transmitted using the uplink resource, the data of the LCH 2 will not be transmitted using the uplink resource.

For another example, in FIG. 7, the total number of logical channels under a DRB 1, a DRB 2, and a DRB 3 is 4+3+1=8, so N=8 may be possible. For example, when 8 bits are 1000 010 0, it represents that data on an LCH 1 of a DRB 1 and an LCH 2 of a DRB 2 can be transmitted using a carrier where the uplink resource is located, while other logical channels cannot be transmitted using the carrier. In this way, it is possible to indicate more flexibly usage of uplink resources of data of various logical channels corresponding to various bearers, while it is not necessary to make usage of an uplink resource of data on the LCH 1 of each DRB the same, but bit overhead is increased. Similarly, if an LCH 2 of a DRB 2 is not activated, even if first indication information indicates that data of the LCH 2 may be transmitted using the uplink resource, the data of the LCH 2 cannot be transmitted using the uplink resource, that is, only data on an LCH 1 of a DRB 1 can be transmitted using a carrier where the uplink resource is located, while other logical channels cannot be transmitted using the carrier.

Or, in FIG. 7, bearers configured with a data duplication transmission function or data duplication transmission activation are a DRB 1 and a DRB 2, and the total number of logical channels under the DRB 1 and the DRB 2 is 4+3=7, so N=7 may be possible. For example, when 7 bits are 1000 010, it represents that data on an LCH 1 of a DRB 1 and an LCH 2 of a DRB 2 can be transmitted using a carrier where the uplink resource is located, while other logical channels cannot be transmitted using the carrier. For a bearer that is not configured with a data duplication transmission function or data duplication transmission activation, that is, a DRB 3, since there is only one logical channel for transmitting data, data of the logical channel may be transmitted using any carrier, so it may be transmitted on the uplink resource; or it is pre-determined that data of a logical channel of the DRB 3 cannot be transmitted using the uplink resource. Similarly, if an LCH 2 of a DRB 2 is not activated, even if first indication information indicates that data of the LCH 2 may be transmitted using the uplink resource, the data of the LCH 2 cannot be transmitted using the uplink resource, that is, only data on an LCH 1 of a DRB 1 can be transmitted using a carrier where the uplink resource is located, while other logical channels cannot be transmitted using the carrier.

The above two indication modes of the bitmap shown in FIG. 7 are only examples, and in actual use, N bits may have other indication modes. For example, N may be the maximum number of logical channels that can be supported by a terminal device corresponding to one or more bearers, or the maximum number or actual number of logical channels configured by a network device for a terminal device. For another example, N may be the maximum number of logical channels that a terminal device can support under one or more cell groups, or the maximum number or actual number of logical channels configured by a network device for a terminal device.

For a bearer configured with data duplication transmission in a DC scenario, for example, it may be in an order of MCG first and SCG later, and each CG corresponds to each bit among N bits from front to back or from back to front in an ascending order of indexes of logical channels. Or, for each bearer configured with data duplication transmission, an order is SCG first and then MCG, and each CG corresponds to each bit among N bits from front to back or from back to front in an ascending order of indexes of logical channels. Or for a bearer configured with data duplication transmission in a DC scenario, for example, it may be in an order of MCG first and SCG later, and each CG corresponds to each bit among N bits from front to back or from back to front in a descending order of indexes of logical channels. Or, for each bearer configured with data duplication transmission, an order is SCG first and then MCG, and each CG corresponds to each bit among N bits from front to back or from back to front in a descending order of indexes of logical channels.

In the implementation, the first indication information may be dedicated indication information for the terminal device. Or, the first indication information may be common indication information for multiple terminal devices. For example, if multiple terminal devices belong to a terminal device group, or are of a same terminal device group type, or are all configured with grant, a piece of first indication information may be used to indicate whether data of respective logical channels of terminal devices of the group can be transmitted using an uplink resource indicated by respective configured grant information.

Optionally, before act 610, a network device may send an RRC message to a terminal device, wherein the RRC message includes information of a carrier allowed to be used by the at least one logical channel. Accordingly, the terminal device receives the RRC message.

For example, a network device may configure a terminal device with information related to data duplication transmission through an RRC message, including a logical channel identifier, a cell group id corresponding to a bearer and the like. At the same time, the RRC message may indicate an initial state of data duplication transmission and a list of serving cells allowed to be mapped by each logical channel corresponding to the bearer, that is, a list of carriers allowed to be used by each logical channel. The list may at least be used for data duplication transmission in the initial state. For example, a network device may configure a DRB 1 as a bearer of data duplication transmission, with an initial state of deactivation and a architecture of a combination of CA and DC. Logical channels under a DRB 1 include an LCH 1 to an LCH 4, wherein the LCH 1 corresponds to an MCG and carriers allowed to be used are a CC 1 and a CC 2, the LCH 2 corresponds to an MCG and carriers allowed to be used are a CC 3 and a CC 4, the LCH 3 corresponds to an MCG and carriers allowed to be used are a CC 5 and a CC 6, and the LCH 4 corresponds to an SCG and carriers allowed to be used are a CC 1 and a CC 2. A network device may configure a DRB 2 as a bearer without performing data duplication transmission, and carriers allowed to be used for logical channels under the DRB 2 are a CC 1 to a CC 4.

According to the RRC message, a terminal device configures data duplication transmission of each bearer. When a terminal device receives a MAC CE sent by a network device, the MAC CE is used to indicate activation or deactivation of a function of data duplication transmission. If the MAC CE indicates that the function of data duplication transmission of a DRB 1 is activated, the terminal device performs data duplication transmission for a DRB 1. Accordingly, the terminal device determines whether an uplink resource may be used to transmit data from each logical channel according to carriers allowed to be used and configured for the each logical channel. For example, data of an LCH 1 can only be transmitted through a CC 1 or a CC 2, data of an LCH 2 can only be transmitted through a CC 3 or a CC 4, and data of an LCH 3 can only be transmitted through a CC 5 or a CC 6.

Thereafter, if a network device uses a dedicated signaling, for example, change indication information for indicating that a state of data duplication transmission carried on a MAC CE has changed, then the state of data duplication transmission is changed according to the change indication information. For example, taking an MCG as an example, the change indication information indicates that logical channels used by the MCG are changed from an LCH 1, an LCH 2, and an LCH 3 to the LCH 1 and the LCH 3, while logical channels used by an SCG are unchanged. Upon receiving the change indication information, a terminal device modifies the state of data duplication transmission according to indication of the change indication information, that is, changes the logical channels used by the MCG from the LCH 1, the LCH 2, and the LCH 3 to the LCH 1 and the LCH 3.

Thereafter, when receiving DCI carrying first indication information or configured grant information (configuredGrantconfig) carrying the first indication information, the terminal device determines whether each changed logical channel, i.e., the LCH 1 and the LCH 3, can use a corresponding uplink resource to transmit on a carrier where the uplink resource is located.

It should be understood that a terminal device may determine whether data of each logical channel can be transmitted using an uplink resource indicated by uplink grant information according to first indication information or, the terminal device may determine a carrier allowed to be used by each logical channel according to a list of carriers allowed to be used by each logical channel, that is, a list of carriers indicated by the RRC message, so as to determine whether data of the logical channel can be transmitted using the uplink resource.

That is, if a network device configures a list of carriers allowed to be used by a logical channel for a terminal device through an RRC message, and the terminal device receives first indication information, then in one implementation, the terminal device may determine whether an uplink resource can be used for transmission according to one of the list of carriers or the first indication information, for example, according to the first indication information. In another implementation, after receiving the first indication information, the terminal device determines that the list of carriers configured by the RRC is invalid. In yet another implementation, for an uplink resource corresponding to first indication information, such as an uplink resource scheduled by DCI carrying first indication information, a terminal device may determine data of which logical channel may be transmitted on an uplink resource indicated by the uplink grant information according to the first indication information, while for other uplink resources, the terminal device determines data of which logical channel may be transmitted on the uplink resource according to the list of carriers configured by the RRC.

The configuration, activation, and change of data duplication transmission described above are only examples. In an implementation of the present disclosure, the state of data duplication transmission changes, which may be as follows: the number of logical channels used by an MCG increases, decreases, or changes; and/or the number of logical channels used by an SCG increases, decreases, or changes; and/or logical channel identifiers used by an MCG increases, decreases, or changes; and/or logical channel identifiers used by an SCG increases, decreases, or changes.

In an implementation of the present disclosure, the RRC message may include information of a carrier allowed to be used by the at least one logical channel. The information may be configured for the bearer, for example, carried in a radio bearer configuration (RadioBearerconfig) and it may be configured for a logical channel, for example, carried in a logical channel configuration (logicalchannelconfig).

When a function of data duplication transmission is deactivated, each CG has only one logical channel for transmitting data of the bearer. In the implementation, optionally, data of a logical channel that may be used when a function of data duplication transmission of one bearer of the terminal device is deactivated may be transmitted on any carrier, that is, an LCH-to-Cell restriction configured for the terminal device fails or an LCH-to-Cell restriction is not configured for the terminal device. For example, assuming that a logical channel that may be used when a function of data duplication transmission of the DRB 1 is deactivated is an LCH 1, data on the LCH 1 may be transmitted on any carrier. Or, optionally, data of a logical channel that may be used when a function of data duplication transmission of a bearer of a terminal device is deactivated is only transmitted on a carrier that satisfies an LCH-to-Cell restriction, that is, a LCH-to-Cell restriction configured for it is still valid.

Of course, whether the data of the logical channel that may be used when the function of data duplication transmission of the bearer is deactivated can be transmitted on an uplink resource indicated by uplink grant information may also be determined through first indication information. At this time, the first indication information may be used to indicate whether a logical channel corresponding to the bearer can use the uplink resource for transmission when the function of data duplication transmission of the bearer is deactivated.

It should be understood that when a function of data duplication transmission of a bearer is deactivated, the bearer only corresponds to one logical channel, so this logical channel is a logical channel that may be used when the function of data duplication transmission is deactivated.

If first indication information is implemented in a mode of a bitmap, for a bearer that is not configured with a function of data duplication transmission, for example, whether data of the logical channel that may be used corresponding to the bearer can be transmitted using a carrier where the uplink resource is located may be indicated through one bit, such as the highest bit, in the bitmap.

The implementation may be applied to a case that a state of data duplication transmission changes, such as when the number of activated logical channels changes, when identifiers of activated logical channels change, when a function of data duplication transmission changes from deactivation to activation, and when a function of data duplication transmission changes from activation to deactivation. It may also be applied to a configuration of initial data duplication transmission, that is, a network device initially configures a carrier allowed to be used by a logical channel of a terminal device for the terminal device. It may also be applied to a case that a state of data duplication transmission is unchanged, but it is necessary to update a carrier allowed to be used by a logical channel of a terminal device.

For example, in a case that the number of activated logical channels varies from more to less, if logical channels under one CG configured by a network device through an RRC message for a terminal device are all configured with carriers allowed to be used, then, when change indication information in a MAC CE indicates that logical channels which can be used under the CG vary from more to less, or when a terminal device determines that logical channels which can be used under the CG vary from more to less according to a change condition, that a carrier which is allowed to be used and configured through the RRC message for a current logical channel may still be used, thus the terminal device determines whether data of the current logical channel can be transmitted by using the uplink resource. And when the change indication information indicates that the logical channels which can be used under the CG vary from less to more, whether the data of the current logical channel can be transmitted by using the uplink resource is re-determined according to the first indication information.

Optionally, the terminal device uses the uplink resource indicated by the uplink grant information to send data of a target logical channel among the at least one logical channel, wherein a carrier allowed to be used by the target logical channel matches a carrier where the uplink resource is located.

For example, if carriers allowed to be used by a target logical channel are a CC1, a CC2, and a CC3, and a carrier of the uplink resource is a CC1, then data of the target logical channel can be sent on the uplink resource, and a network device may indicate through the first indication information to a terminal device that the data of the target logical channel can be sent on the uplink resource.

It should be understood that in an implementation of the present disclosure, a carrier allowed to be used by a target logical channel matches a carrier where the uplink resource is located, and this includes two cases. In one case, a carrier allowed by a target logical channel is the same as a carrier where the uplink resource is located, for example, a carrier allowed to be used by a target logical channel is a CC 1, and a carrier where the uplink resource is located is a CC 1. In another case, multiple carriers allowed to be used by a target logical channel include a carrier where the uplink resource is located. For example, carriers allowed to be used by a target logical channel are a CC 1, a CC 2, and a CC 3, and a carrier where the uplink resource is located is a CC 1. Both the above two cases may be called "match", so that the data of the target logical channel is sent on the uplink resource.

Further, optionally, if channel quality on a carrier where the uplink resource is located meets a preset condition, the terminal device uses the uplink resource to send the data of the target logical channel.

That is to say, when the terminal device receives first indication information sent by a network device for indicating that the data of the target logical channel can be sent on the uplink resource, the terminal device further needs to determine whether channel quality on a carrier where the uplink resource is located meets a preset condition, such as a Reference Signal Receiving Power (RSRP) is greater than an RSRP threshold, or Reference Signal Receiving Quality (RSRQ) is greater than an RSRQ threshold, or a Signal to Interference plus Noise Ratio (SINR) is less than an SINR threshold, the terminal device uses the uplink resources to transmit the data of the target logical channel.

Figure 8:
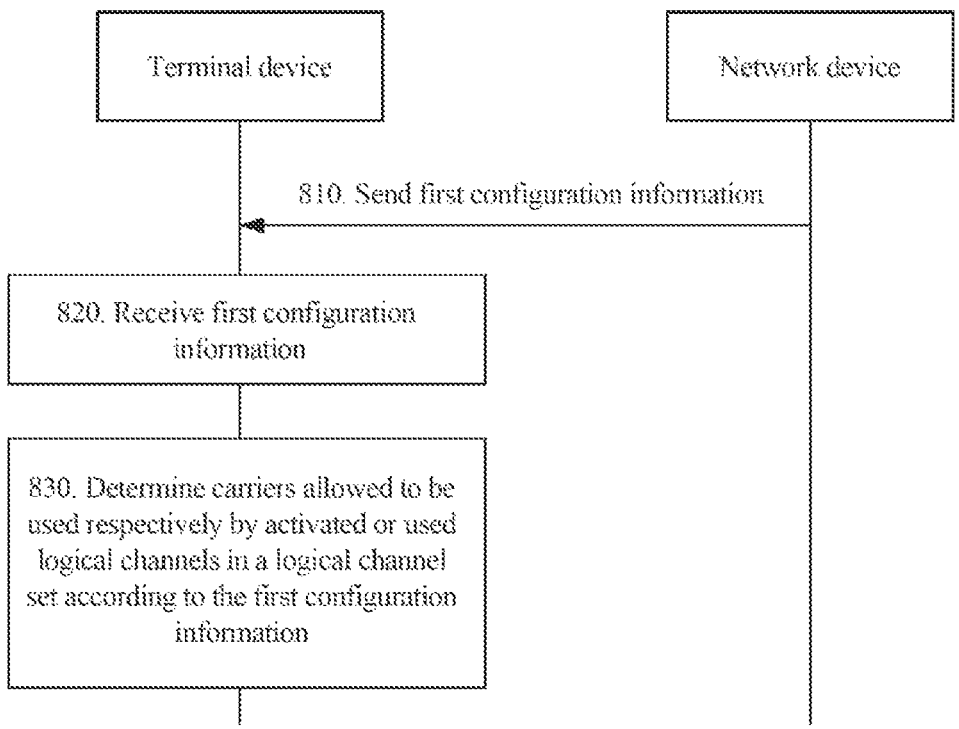
FIG. 8 is a flow interaction diagram of a method based on data duplication transmission according to another implementation of the present disclosure.

FIG. 8 is a flow interaction diagram of a method 800 based on data duplication transmission of another implementation of the present disclosure. The method may be performed by a terminal device and a network device. As shown in FIG. 8, the method 800 includes the following acts.

In act 810, a network device sends first configuration information.

In act 820, a terminal device receives the first configuration information.

The first configuration information is used to indicate carriers allowed to be used by multiple logical channel sets corresponding to a bearer of the terminal device, wherein each logical channel set includes at least part of the logical channels corresponding to the bearer.

In act 830, according to the first configuration information, the terminal device determines a carrier allowed to be used by an activated or used logical channel in a logical channel set.

In an implementation, the network device respectively configures carriers allowed to be used for multiple logical channel sets corresponding to one hearer of the terminal device. In this way, when logical channels in a logical channel set are activated or used, the terminal device can know carriers allowed to be used by these logical channels, so as to carry out data transmission.

In other words, a network device may configure multiple sets of LCH-to-cell restrictions, wherein each set of LCH-to-cell restrictions may be applied to one or more logical channel sets. A network device may configure one or more sets of LCH-to-cell restrictions for a logical channel set.

Various logical channels in multiple logical channels corresponding to a bearer may have various combinations, each of which forms a logical channel set, and each logical channel set includes at least part of the logical channels corresponding to the bearer.

In other words, a network device may respectively configure multiple LCH-to-cell restrictions for the multiple logical channel sets, that is, configure multiple sets of carriers.

The multiple logical channels may be logical channels configured by a network device for the bearer of a terminal device, or a maximum number of logical channels that can be supported by the bearer, or the number of the multiple logical channels is smaller than the maximum number of logical channels that can be supported by the bearer.

Optionally, numbers of logical channels in different logical channel sets are different, and/or logical channel identifiers of logical channels in different logical channel sets are different.

A network device may respectively configure different sets of carriers for multiple logical channel sets, or configure a same set of carriers for logical channel sets with the same number of logical channels, that is, carriers allowed to be used by logical channel sets with the same number of logical channels may be the same.

For example, it may be divided according to logical channel identifiers. A network device configures three logical channels for a DRB 2, namely an LCH 1, an LCH 2, and an LCH 3. Then among these three logical channels, logical channel sets formed by possible combinations are: the LCH 1 is a logical channel set 1, the LCH 1 and the LCH 2 are a logical channel set 2, the LCH 1 and the LCH 3 are a logical channel set 3, the LCH 2 and the LCH 3 are a logical channel set 4, and the LCH 1, the CH 2, and the LCH 3 are a logical channel set 5. The network device may configure five sets of carriers for the five logical channel sets through first configuration information.

In this way, if currently activated logical channels or logical channels that currently have data to be transmitted are an LCH 1 and an LCH 2, a terminal device may determine according to first configuration information, carriers which are allowed to be used and configured by a network device for an LCH 1 and an LCH 2 in the logical channel set 2 respectively. If currently activated logical channels or logical channels that currently have data to be transmitted are an LCH 1, an LCH 2, and an LCH 3, a terminal device may determine according to first configuration information, carriers which are allowed to be used and configured by a network device for an LCH 1, an LCH 2, and an LCH 3 in the logical channel set 5.

For another example, it may be divided according to the number of logical channels. A network device configures three logical channels for a DRB 2, namely an LCH 1, an LCH 2, and an LCH 3. The LCH 1 is a logical channel set 1, the LCH 1 and the LCH 2 are a logical channel set 2, the LCH 1 and the LCH 3 are a logical channel set 3, the LCH 2 and the LCH 3 are a logical channel set 4, and the LCH 1, the LCH 2, and the LCH 3 are a logical channel set 5. Among them, the logical channel set 1 only includes one logical channel, for which a set of carriers is configured; each of the logical channel set 2, the logical channel set 3, and the logical channel set 4 includes two logical channels, and the same set of carriers is configured for these three logical channel sets; and the logical channel set 5 includes three logical channels, for which a set of carriers is configured. In this way, a network device may configure three sets of carriers for a DRB 1 of a terminal device through first configuration information.

In another understanding, logical channel sets with the same number of logical channels may be regarded as one logical channel set. For example, among the above LCH 1, LCH 2, and LCH 3, the LCH 1 is a logical channel set 1 (which only includes one logical channel), and a combination of the LCH 1 and the LCH 2, a combination of the LCH 1 and the LCH 3, and a combination of the LCH 1 and the LCH 3 are all called a logical channel set 2 (which includes two logical channels), and the LCH 1, the LCH 2, and the LCH 3 are a logical channel set 3 (which includes three logical channels). A network device may configure three sets of carriers for the three logical channel sets respectively through first configuration information.

In this way, if the number of currently activated logical channels or logical channels that currently have data to be transmitted is 1, a terminal device may determine according to first configuration information, a carrier which is allowed to be used and configured by a network device for an LCH 1 in a logical channel set 1. If the number of currently activated logical channels or logical channels that currently have data to be transmitted is 2, a terminal device may determine according to first configuration information, carriers which are allowed to be used and configured by a network device for various logical channels in a logical channel set 2.

It should be understood that when the number of logical channels that currently have data to be transmitted (i.e., currently used logical channels) is less than the number of currently activated logical channels, a logical channel set is determined according to the number of currently used logical channels.

In the implementation, the first configuration information may be carried in configuration information for a bearer, such as a Radio Bearer configuration (RadioBearerconfig), or may be carried in configuration information for a logical channel, such as a logical channel configuration (logicalchannelconfig).

In the implementation, optionally, data of a logical channel that may be used when a function of data duplication transmission of a bearer of the terminal device is deactivated may be transmitted on any carrier, that is, a configured LCH-to-Cell restriction is invalid or an LCH-to-Cell restriction is not configured. For example, assuming that a logical channel that may be used when a function of data duplication transmission of the DRB 1 is deactivated is an LCH 1, that is, a logical channel set 1, data on the LCH 1 may be transmitted on any carrier, that is, LCH-to-Cell restriction is not configured for the logical channel set 1, but carriers allowed to be used are only configured respectively for a logical channel set 2 to a logical channel set 5; or, carriers allowed to be used by the LCH 1 are still determined according to an LCH-to-Cell restriction configured for the logical channel set 1, and transmission is only performed on a carrier that meets an LCH-to-Cell restriction configured for the logical channel set 1 by a network device.

Optionally, carriers allowed to be used by logical channel sets with the same number of logical channels may be the same or different.

For example, a network device configures three logical channels for a DRB 2, namely an LCH 1, an LCH 2, and an LCH 3. Carriers allowed to be used by a logical channel set composed of the LCH 1 and the LCH 2 and carriers allowed to be used by a logical channel set composed of the LCH 2 and the LCH 3 may be the same or different.

Optionally, carriers allowed to be used by logical channel sets with different numbers of logical channels may be the same or different.

For example, a network device configures three logical channels for a DRB 2, namely an LCH 1, an LCH 2, and an LCH 3. Carriers allowed to be used by a logical channel set composed of the LCH 1 and the LCH 2 and carriers allowed to be used by a logical channel set composed of the LCH 1, the LCH 2, and the LCH 3 may be the same or different.

Optionally, the multiple logical channel sets include a first logical channel set and a second logical channel set, carriers allowed to be used by at least one logical channel in the first logical channel set are the same as carriers allowed to be used by at least one logical channel in the second logical channel set, wherein the number of logical channels in the first logical channel set is the same as or different from that of logical channels in the second logical channel set.

When a network device configures a carrier allowed to be used for each logical channel set, it may specifically configure a carrier allowed to be used for each logical channel in the logical channel set. For example, among an LCH 1, zap LCH 2, and an LCH 3 under a DRB 2, the LCH 1 is a logical channel set 1, the LCH 1 and the LCH 2 are a logical channel set 2, the LCH 1 and the LCH 3 are a logical channel set 3, the LCH 2 and the LCH 3 are a logical channel set 4, and the LCH 1, the LCH 2, and the LCH 3 are a logical channel set 5. A network device may configure carriers allowed to be used for the LCH 1 and the LCH 2 in the logical channel set 2 as a CC 1 and a CC 2 respectively, and configure carriers allowed to be used for the LCH 1 and the LCH 3 in the logical channel set 3 as a CC 1 and a CC 3 respectively. A network device may also configure carriers allowed to be used for the LCH 1 and the LCH 2 in the logical channel set 2 as a CC 1 and a CC 2 respectively, and configure carriers allowed to be used for the LCH 1, the LCH 2, and the LCH 3 in the logical channel set 5 as a CC 1, a CC2, and a CC 3 respectively.

When a network device configures a carrier allowed to be used for each logical channel set, it may configure a carrier allowed to be used in a unit of a logical channel set. For example, carriers which are allowed to be used and configured for an LCH 1 and an LCH 2 in a logical channel set 2 are a CC 1 and a CC 2 respectively, and carriers which are allowed to be used and configured for an LCH 1 and an LCH 3 in a logical channel set 3 are a CC 1 and a CC 3 respectively. A terminal device uses different carriers to transmit data of different logical channels. For example, if current used logical channels are a logical channel set 3, then a CC 1 is used to transmit data of an LCH 1 and a CC 3 is used to transmit data of an LCH 3.

Optionally, the method further includes that the terminal device receives uplink grant information; and the terminal device uses an uplink resource indicated by the uplink grant information to send data of a target logical channel corresponding to the bearer, and a carrier allowed to be used by the target logical channel matches a carrier where the uplink resource is located.

For example, if a carrier allowed by an LCH 2 in a logical channel set 2 is a CC 1, and a carrier where an uplink resource indicated by the uplink grant information is located is a CC 1, then the LCH 2 may be used as the target logical channel, and data on the LCH 2 can be sent on the uplink resource.

For another example, if a carrier allowed by an LCH 2 in a logical channel set 2 at least includes a CC 1, and a carrier where an uplink resource indicated by the uplink grant information is located is a CC 1, then the LCH 2 may be used as the target logical channel, and data on the LCH 2 can be sent on the uplink resource.

Further, optionally, if channel quality on a carrier where the uplink resource is located meets a preset condition, the terminal device uses the uplink resource to send the data of the target logical channel.

That is to say, when determining that the data of the target logical channel can be transmitted on the uplink resource, the terminal device also needs to determine whether the channel quality on the carrier where the uplink resource is located meets the preset condition. For example, only when RSRP is greater than an RSRP threshold, or RSRQ is greater than an RSRQ threshold, or an SINR is less than an SINR threshold, the terminal device uses the uplink resource to transmit the data of the target logical channel.

For example, currently activated logical channels or logical channels that currently have data to be transmitted are an LCH 1 and an LCH 2 in a logical channel set 2. A network device configures carriers allowed to be used for an LCH 1 and an LCH 2 in a logical channel 2 as a CC 1 and a CC 2 respectively, and a carrier where an uplink resource indicated by the uplink grant information is located is a CC1, a terminal device determines that data on the LCH 1 can be transmitted on the uplink resource and determines that the data may be sent on the uplink resource only when channel quality on the CC1 is good to a certain extent.

For another example, if a terminal device determines that channel quality on a CC 1 and a CC 2 is good, and determines according to first configuration information that data on an LCH 1 and an LCH 2 in a logical channel set 2 may be transmitted using the CC 1 and the CC 2, then the terminal device uses the LCH 1 and the LCH 2 to perform data duplication transmission, and uses the CC 1 and the CC 2 to perform transmission on corresponding uplink resources respectively.

Figure 9:
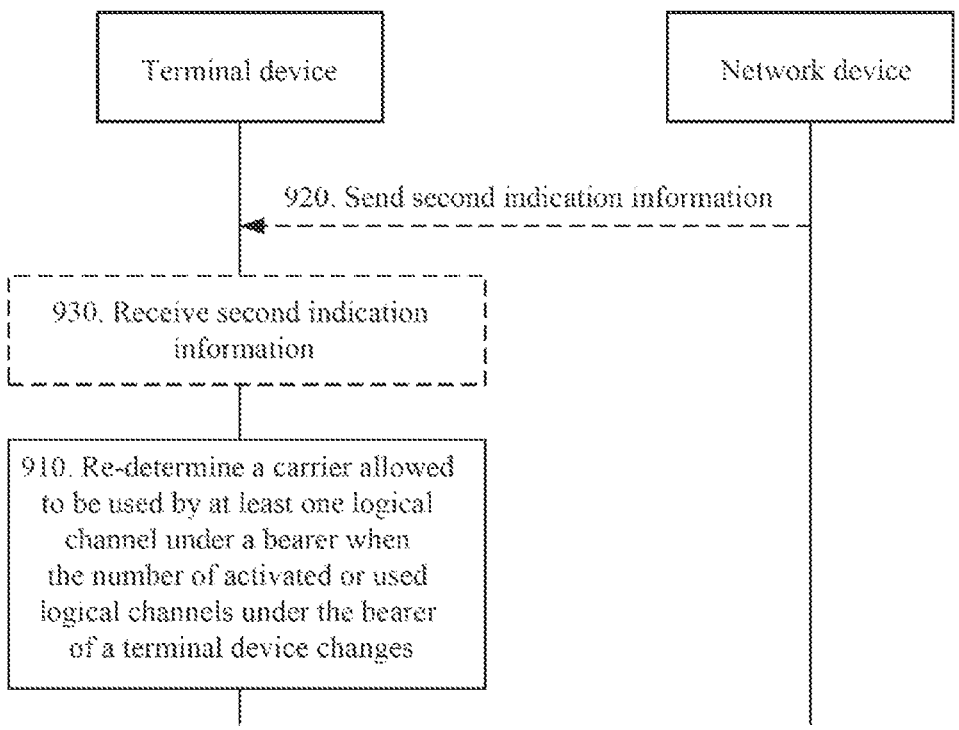
FIG. 9 is a flow interaction diagram of a method based on data duplication transmission according to another implementation of the present disclosure.

FIG. 9 is a flow interaction diagram of a method 900 based on data duplication transmission of another implementation of the present disclosure. The method may be performed by a terminal device and a network device. As shown in FIG. 9, the method 900 includes the following acts.

In act 910, when the number of activated logical channels corresponding to a bearer changes, a terminal device determines a carrier allowed to be used by al least one logical channel under the bearer.

In the implementation, when the number of activated logical channels corresponding to a bearer changes, the terminal device may re-determine a carrier allowed to be used by at least one logical channel corresponding to the bearer according to a preset rule, thereby effectively completing data transmission.

For example, in act 910, if the activated logical channels corresponding to the bearer are changed from M logical channels to N logical channels and M is greater than N, the terminal device may use at least part of carriers allowed to be used by deactivated M-N logical channels as carriers allowed to be used by at least part of the N logical channels, wherein M and N are positive integers.

Further, optionally, the terminal device may use at least part of carriers allowed to be used by deactivated M-N logical channels as a part of carriers allowed to be used by a specific logical channel in the N logical channels; or, the terminal device allocates evenly at least part of carriers allowed to be used by deactivated M-N logical channels to each logical channel in the N logical channels as a part of carriers allowed to be used by each logical channel in the N logical channels; or, the terminal device allocates evenly at least part of carriers allowed to be used by deactivated M-N logical channels to K logical channels in the N logical channels as a part of carriers allowed to be used by each logical channel in the K logical channels, K<N.

It should be understood that the above mentioned allocating one or some carriers e.g., a first carrier) in carriers allowed to be used by deactivated M-N logical channels to a logical channel, may be adding the first carrier to carriers allowed to be used by the logical channel; or may be using the first carrier to replace other carriers in carriers allowed to be used by the logical channel, that is, a carrier allowed to be used by the logical channel is changed to the first carrier.

The at least one logical channel is at least part of logical channels corresponding to the bearer. For example, the at least one logical channel may be at least one logical channel or at least one activated logical channel after the number of activated logical channels corresponding to the bearer changes, such as the N logical channels.

Figure 10:
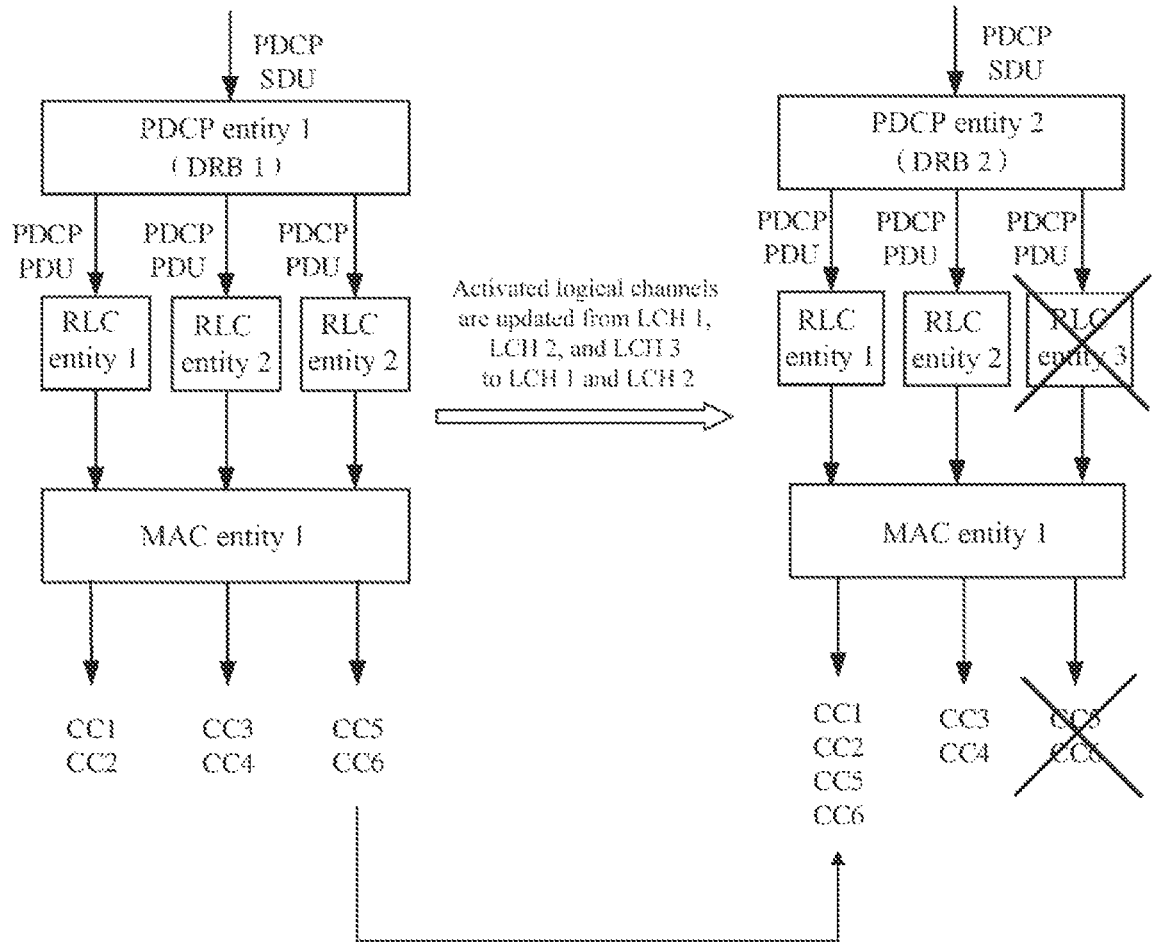
FIG. 10 is a schematic diagram of an implementation based on the method shown in FIG. 9.

Taking FIG. 10 as an example, a network device configures three logical channels for a DRB 2, namely an LCH 1, an LCH 2, and an LCH 3. An LCH-to-Cell restriction configured by the network device for the LCH 1 means that carriers which are allowed to be used and configured for the LCH 1 are a CC 1 and a CC 2; carriers which are allowed to be used and configured by the network device for the LCH 2 are a CC 3 and a CC 4; and carriers which are allowed to be used and configured by the network device for the LCH 3 are a CC 5 and a CC 6.

If a terminal device receives change indication information carried on a MAC CE for indicating a state change of data duplication transmission, it is assumed that the change indication information indicates that the LCH 3 is deactivated, that is, activated logical channels change from the LCH 1, the LCH 2, and the LCH 3 to the LCH 1 and the LCH 2, that is, M=3 and N=2, and the number of activated logical channels is changed from more to less, and it is assumed that a specific logical channel is the LCH 1, then the terminal device may allocate the CC 5 and the CC 6 corresponding to the LCH 3 to the LCH 1, so that carriers allowed to be used by the LCH 1 become the CC 1, the CC 2, the CC 5, and the CC 6.

Or, a terminal device may evenly allocate the CC 5 and the CC 6 corresponding to the LCH 3 to the LCH 1 and the LCH 2, so that carriers allowed to be used by the LCH 1 become the CC 1, the CC 2, and the CC 5, and carriers allowed to be used by the LCH 2 become the CC 3, the CC 4 and the CC 6.

Or, carriers allowed to be used by deactivated M-N logical channels may not be used, that is, they may not be used as carriers allowed to be used by other logical channels. For example, in FIG. 10, after the LCH 3 is deactivated, carriers CC 5 and CC 6 allowed to be used by the LCH 3 are not used, carriers allowed by the LCH 1 are still the CC 1 and the CC 2, and carriers allowed by the LCH 2 are still the CC 3 and the CC 4.

What is shown in FIG. 10 is only an example, and there may be other allocation ways, which are not limited by an implementation of the present disclosure. A terminal device may re-allocate carriers corresponding to deactivated M-N logical channels according to a preset allocation rule or an allocation rule configured by a network device, so that these carriers are allocated to other logical channels that have data to be transmitted. In this way, carrier resources may be fully utilized, more transmission opportunities are provided for a terminal device, services are guaranteed to be transmitted to a network as soon as possible, and Quality of Service (QoS) is satisfied.

Optionally, the number of the at least one logical channel in act 910 is the maximum number of logical channels supported by the bearer, or the number of logical channels for data duplication transmission configured by the network device for the terminal device, or the maximum number of logical channels that can be used for data duplication transmission configured by the network device for the terminal device, or the maximum number of logical channels supported by the terminal device, or the maximum number of logical channels corresponding to a bearer for data duplication transmission supported by the terminal device, or the number of logical channels for data duplication transmission corresponding to the bearer configured by the network device for the terminal device, or the maximum number of logical channels that can be used for data duplication transmission corresponding to the bearer configured by the network device for the terminal device.

The specific logical channel may be one logical channel or multiple logical channels. The number of the multiple logical channels may be predefined, determined by the terminal device itself, or indicated by the network device.

The specific logical channel may be a logical channel corresponding to the bearer configured by the network device, a logical channel under a Master Cell Group (MCG), or a logical channel under a Secondary Cell Group (SCG).

For example, the specific logical channel may be any one of the N logical channels, or a logical channel that can be used when a function of data duplication transmission of the bearer is deactivated, or a primary logical channel configured by the network device for the terminal device, or a logical channel for transmitting PDCP control PDUs.

The primary logical channel may be, for example, a logical channel for transmitting PDCP control PDUs, a logical channel that can be used when a function of data duplication transmission of the bearer is deactivated, a logical channel that can be used when a function of data duplication transmission of the bearer is initially deactivated, a primary logical channel under an MCG, a primary logical channel under an SCG, or a primary logical channel corresponding to the configured bearer.

For another example, the specific logical channel is determined according to at least one of channel quality, a logical channel identifier and a cell group (CG) identifier of the at least one logical channel. For example, the specific logical channel is a logical channel with the best channel quality among the at least one logical channel, any logical channel among logical channels with channel quality higher than a preset threshold, a logical channel with the largest logical channel identifier, a logical channel with the largest logical channel identifier among logical channels with channel quality higher than the preset threshold, or a logical channel with the smallest logical channel identifier among logical channels with channel quality higher than the preset threshold. Further, a CG identifier may be used to indicate the specific logical channel is a logical channel, which meets the above condition, under which CG.

The specific logical channel may be one logical channel or multiple logical channels.

Optionally, as shown in FIG. 9, before act 910, the method further includes acts 920 and 930.

In act 920, a network device sends second indication information to a terminal device.

In act 930, the terminal device receives the second indication information sent by the network device.

The second indication information is used for indicating the terminal device to determine a carrier allowed to be used by at least one logical channel corresponding to a bearer when the number of activated logical channels corresponding to the bearer changes.

At this time, in act 910, when the number of logical channels activated under one bearer changes, the terminal device determines a carrier allowed to be used by the at least one logical channel according to the second indication information.

The above allocation rule may be preconfigured, for example, as stipulated in a protocol, or the above allocation rule may be indicated by the second indication information. Second indication information indicates a terminal device to use at least part of carriers allowed to be used by deactivated M-N logical channels as at least part of carriers allowed to be used by a specific logical channel in the N logical channels; or indicates a terminal device to allocate evenly at least part of carriers allowed to be used by deactivated M-N logical channels to each logical channel in the N logical channels as carriers allowed to be used by each logical channel in the N logical channels; or indicates a terminal device to allocate evenly at least part of carriers allowed to be used by deactivated M-N logical channels to each of K logical channels as carriers allowed to be used by each of the K logical channels, wherein K<N.

The second indication information may further indicate, for example, to modify and/or re-determine a carrier allowed to be used by at least one logical channel corresponding to the bearer. After receiving the second indication information, the terminal device modifies a carrier allowed to be used by the at least one logical channel.

Optionally, before act 910, a network device may send an RRC message to a terminal device, wherein the RRC message includes information of a carrier allowed to be used by the at least one logical channel. Accordingly, the terminal device receives the RRC message.

For example, a network device may configure a corresponding logical channel identifier, a cell group id, a logical channel (also called a primary leg) which can be used during deactivation and so on for a DRB 1 of a terminal device through an RRC message. Meanwhile, the RRC message may indicate an initial state of data duplication transmission, and/or a list of carriers allowed to be used by each logical channel corresponding to the bearer in the initial state. The network device may configure a carrier allowed to be used by each logical channel according to the maximum number of logical channels supported by one bearer; or configure a carrier allowed to be used for each logical channel for the maximum number of logical channels under CA of a CG.

For example, a network device may configure a DRB 2 as a bearer of data duplication transmission under a CA, and logical channels corresponding to the bearer include an LCH 1, an LCH 2, and an LCH 3. The LCH 1 corresponds to a MCG and carriers allowed to be used are a CC 1 and a CC 2, the LCH 2 corresponds to the MCG and carriers allowed to be used are a CC 3 and a CC 4, the LCH 3 corresponds to the MCG and carriers allowed to be used are a CC 5 and a CC 6.

For another example, a network device may configure a DRB 1 as a bearer of data duplication transmission under CA and DC, where an LCH 1 corresponding to the bearer corresponds to an MCG, an LCH 2 corresponds to the MCG, an LCH 3 corresponds to the MCG, and an LCH 4 corresponds to an SCG. A function of data duplication transmission under CA is configured by a network device for an MCG corresponding to a DRB 1, and the maximum number of logical channels supported by data duplication transmission under CA of the MCG is 3, so it is configured with respect to three logical channels. For example, carriers allowed by an LCH 1 are a CC 1 and a CC 2, carriers allowed by an LCH 2 are a CC 3 and a CC 4, and carriers allowed by an LCH 3 are a CC 5 and a CC 6. Carriers allowed by an LCH 4 of an SCG are a CC 7 and a CC 8.

According to the RRC message, the terminal device configures data duplication transmission of the bearer. Thereafter, if the terminal device receives change indication information carried on a MAC CE for indicating that a state of data duplication transmission has changed, or the terminal device determines that a state of data duplication transmission has changed according to a change condition, for example, a logical channel is deactivated, then the terminal device may allocate a carrier which is allowed to be used and configured for the logical channel to another logical channel, such as a primary leg or any other activated logical channel, as shown in FIG. 10.

It should be understood that if a terminal device receives change indication information carried on a MAC CE, or if a terminal device determines that a state of data duplication transmission has changed according to a change condition, and the number of activated logical channels changes from less to more, the terminal device may also re-determine a carrier allowed to be used by a newly-added activated logical channel according to a preset rule. For example, one or more carriers allowed to be used by a specific logical channel are allocated to the newly-added logical channel, or for example, a part of carriers allowed to be used by all other logical channels are evenly allocated to the newly-added logical channel. This is not limited herein.

Optionally, data of a logical channel which can be used when a function of data duplication transmission of a bearer of the terminal device is deactivated may be transmitted on any carrier, that is, a LCH-to-Cell restriction configured for it is invalid or an LCH-to-Cell restriction is not configured for it. For example, assuming that a logical channel which can be used when a function of data duplication transmission of the DRB 1 is deactivated is an LCH 1, data on the LCH 1 may be transmitted on any carrier.

Or, optionally, a carrier allowed to be used by a logical channel which can be used when a function of data duplication transmission of a bearer of the terminal device is deactivated may be determined according to a list of carriers allowed to be used and configured by a network device for the bearer. For example, assuming that a logical channel which can be used when a function of data duplication transmission of the DRB 1 is deactivated is an LCH 1, a carrier allowed to be used by the LCH 1 is a carrier configured by a network device for it through an RRC signaling.

Optionally, the method further includes that the terminal device receives uplink grant information; and the terminal device uses an uplink resource indicated by the uplink grant information to send data of a target logical channel corresponding to the bearer, and a carrier allowed to be used by the target logical channel matches a carrier where the uplink resource is located.

For example, if carriers allowed to be used by a target logical channel are a CC1 and a CC2, and a carrier where an uplink resource is located is a CC1, then data of the target logical channel can be sent on the uplink resource.

Further, optionally, if channel quality on a carrier where the uplink resource is located meets a preset condition, the terminal device uses the uplink resource to send the data of the target logical channel.

That is to say, when determining that the data of the target logical channel can be transmitted on the uplink resource, the terminal device also needs to determine whether the channel quality on the carrier where the uplink resource is located meets the preset condition. For example, only when RSRP is greater than an RSRP threshold, or RSRQ is greater than an RSRQ threshold, or SINR is less than an SINR threshold, the terminal device uses the uplink resource to send the data of the target logical channel.

It should be noted that, various implementations described in the present disclosure and/or technical features in various implementations may be arbitrarily combined with each other without conflict, and technical solutions obtained after the combination should also fall into the protection scope of the present disclosure.

It should be understood that magnitudes of numbers of the foregoing processes do not mean execution sequences in various implementations of the present disclosure. The execution sequence of the processes should be determined according to their functions and internal logics, and should not form any limitation on implementation processes of the implementations of the present disclosure.

The communication method according to the implementations of the present disclosure have been described in detail above, and the device according to the implementations of the present disclosure will be described below with reference to FIG. 11 to FIG. 21. The technical features described in the method implementations are applicable to following device implementations.

Figure 11:
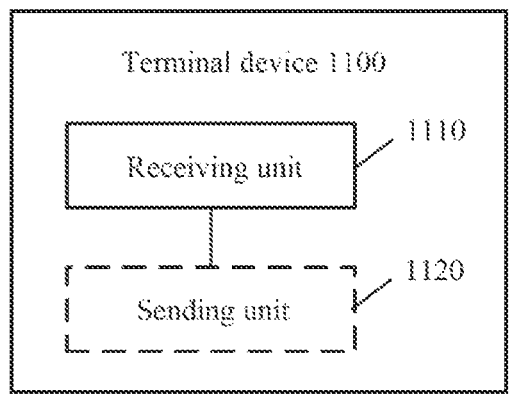
FIG. 11 is a schematic block diagram of a terminal device according to an implementation of the present disclosure.

FIG. 11 is a schematic block diagram of a terminal device 1100 according to an implementation of the present disclosure. As illustrated in FIG. 11, the terminal device 1100 includes a receiving unit 1110.

The receiving unit 1110 is configured to receive uplink grant information.

The receiving unit 1110 is further configured to receive first indication information, wherein the first indication information is used to indicate whether data of at least one logical channel of the terminal device can be transmitted using an uplink resource indicated by the uplink grant information.

Therefore, according to the received first indication information, the terminal device determines whether data of each activated logical channel can be transmitted using a current uplink resource, so that when an activation/deactivation state of a logical channel changes, a carrier resource can still be effectively used to transmit data of each logical channel.

Optionally, the first indication information is carried in downlink control information (DCI), a Radio Resource Control (RRC) message, or a Medium Access Control Control Element (MAC CE).

Optionally, the first indication information and the uplink grant information are carried in the same message.

Optionally, the logical channel is a logical channel corresponding to a bearer configured with or without a function of data duplication transmission, or a logical channel corresponding to a bearer with an activated or deactivated function of data duplication transmission.

Optionally, the first indication information includes a logical channel identifier of a logical channel that can use the uplink resource to transmit data of the logical channel, or includes a logical channel identifier of a logical channel that cannot use the uplink resource to transmit data of the logical channel.

Optionally, the first indication information includes multiple bits, wherein each bit corresponds to one logical channel, and a value of each bit indicates whether data of a logical channel corresponding to each bit can be transmitted using the uplink resource.

Optionally, the number of the at least one logical channel is: the maximum number of logical channels supported by one bearer; or, the maximum number of logical channels supported by one bearer of the terminal device; or, the maximum number of logical channels corresponding to one bearer configured by the network device for the terminal device; or, the total number of logical channels corresponding to all bearers configured by the network device for the terminal device.

Optionally, the number of the at least one logical channel is: the number of logical channels corresponding to all bearers corresponding to a cell group (CG) configured by the network device for the terminal device; or, the number of all logical channels under one CG configured by the network device for the terminal device; or, the maximum number of logical channels under one CG configured by the network device for the terminal device; or, the maximum number of logical channels supported by the terminal device in a CG.

Optionally, the first indication information is dedicated indication information fix the terminal device or common indication information for multiple terminal devices.

Optionally, the receiving unit 1110 is further configured to receive a Radio Resource Control (RRC) message, wherein the RRC message includes information of a carrier allowed to be used by the at least one logical channel.

Optionally, the terminal device further includes a sending unit 1120, which is configured to send data of a target logical channel in the at least one logical channel by using the uplink resource, and a carrier allowed to be used by the target logical channel matches a carrier where the uplink resource is located.

Optionally, the sending unit 1120 is specifically configured to send the data of the target logical channel by using the uplink resource if channel quality on a carrier where the uplink resource is located meets a preset condition.

Optionally, data of a logical channel which can be used when a function of data duplication transmission of a bearer of the terminal device is deactivated, can be transmitted on any carrier.

It should be understood that the terminal device 1100 may perform corresponding operations performed by a terminal device in the above method 600, which will not be repeated here for brevity.

Figure 12:
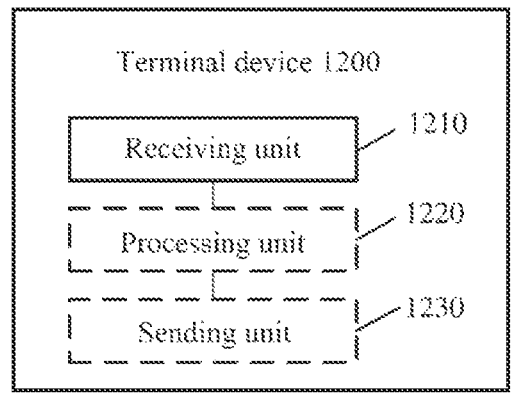
FIG. 12 is a schematic block diagram of a terminal device according to another implementation of the present disclosure.

FIG. 12 is a schematic block diagram of a terminal device 1200 in accordance with an implementation of the present disclosure. As illustrated in FIG. 12, the terminal device 1200 includes a receiving unit 1210 and a processing unit 1220.

The receiving unit 1210 is configured to receive first configuration information, wherein the first configuration information is used to indicate carriers allowed to be used by multiple logical channel sets corresponding to a bearer, wherein each logical channel set includes at least part of logical channels corresponding to the bearer.

The processing unit 1220 is configured to determine a carrier allowed to be used by an activated or used logical channel in a logical channel set according to the first configuration information.

Therefore, a network device configures carriers allowed to be used respectively for multiple logical channel sets corresponding to a bearer of a terminal device through first configuration information, and the terminal device can know carriers allowed to be used by these logical channels according to the first configuration information when logical channels in a logical channel set are activated or used, so as to carry out data transmission.

Optionally, numbers of logical channels in different logical channel sets are different, and/or logical channel identifiers of logical channels in different logical channel sets are different.

Optionally, carriers allowed to be used by logical channel sets with the same number of logical channels are the same or different.

Optionally, carriers allowed to be used by logical channel sets with different numbers of logical channels are the same or different.

Optionally, the multiple logical channel sets include a first logical channel set and a second logical channel set, carriers allowed to be used by at least one logical channel in the first logical channel set are the same as carriers allowed to be used by at least one logical channel in the second logical channel set, wherein the number of logical channels in the first logical channel set is the same as or different from that in the second logical channel set.

Optionally, the terminal device further includes a sending unit 1230, wherein the receiving unit 1210 is further configured to receive uplink grant information. The transmitting unit 1230 is configured to use an uplink resource indicated by the uplink grant information to send data of a target logical channel corresponding to the bearer, and a carrier allowed to be used by the target logical channel matches a carrier where the uplink resource is located.

Optionally, the sending unit 1230 is specifically configured to send the data of the target logical channel by using the uplink resource if channel quality on a carrier where the uplink resource is located meets a preset condition.

Optionally, data of a logical channel which can be used when a function of data duplication transmission of the bearer is deactivated, can be transmitted on any carrier.

It should be understood that the terminal device 1200 may perform corresponding operations performed by a terminal device in the above method 800, which will not be repeated here for brevity.

Figure 13:
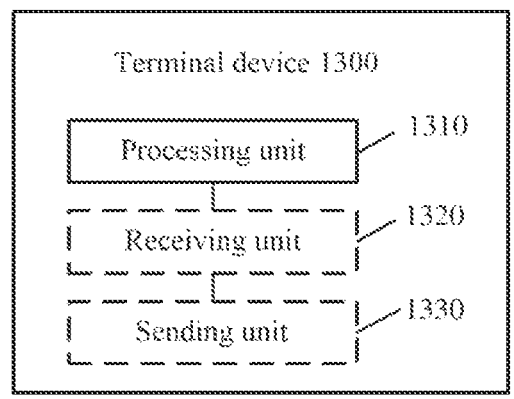
FIG. 13 is a schematic block diagram of a terminal device according to another implementation of the present disclosure.

FIG. 13 is a schematic block diagram of a terminal device 1300 in accordance with an implementation of the present disclosure. As illustrated in FIG. 13, the terminal device 1300 includes a processing unit 1310.

The processing unit 1310 is configured to determine a carrier allowed to be used by at least one logical channel corresponding to a bearer of the terminal device when the number of activated logical channels corresponding to the bearer changes.

Therefore, when the number of activated logical channels corresponding to a bearer changes, the terminal device may re-determine a carrier allowed to be used by at least one logical channel corresponding to the bearer according to a preset rule, thereby effectively completing data transmission.

Optionally, the processing unit 1310 is specifically configured to: if the activated logical channels corresponding to the bearer are changed from M logical channels to N logical channels and M is greater than N, use at least part of carriers allowed to be used by deactivated M-N logical channels as carriers allowed to be used by at least part of the N logical channels, wherein M and N are positive integers.

Optionally, the processing unit 1310 is specifically configured to: use at least part of the carriers allowed to be used by deactivated M-N logical channels as a part of carriers allowed to be used by a specific logical channel in the N logical channels; or, allocate evenly at least part of the carriers allowed to be used by the deactivated M-N logical channels to each logical channel in the N logical channels as a part of carriers allowed to be used by each logical channel in the N logical channels; or, allocate evenly at least part of the carriers allowed to be used by the deactivated M-N logical channels to K logical channels in the N logical channels as a part of carriers allowed to be used by each logical channel in the K logical channels, K<N.

Optionally, the specific logical channel is any one of the N logical channels, or a logical channel which can be used when a function of data duplication transmission of the bearer is deactivated, or a primary logical channel configured by a network device for the terminal device, or a logical channel for transmitting Packet Data Convergence Protocol (PDCP) control Protocol Data Units (PDUs).

Optionally, the primary logical channel is a logical channel for transmitting PDCP control PDUs, or a logical channel which can be used when a function of data duplication transmission of the bearer is deactivated, or a primary logical channel under a Master Cell Group (MCG), a primary logical channel under a Secondary Cell Group (SCG), or a primary logical channel corresponding to the bearer.

Optionally, the specific logical channel is determined according to at least one of channel quality, a logical channel identifier, and a cell group (CG) identifier of the at least one logical channel.

Optionally, the specific logical channel is a logical channel with the best channel quality among the at least one logical channel, any logical channel among logical channels with channel quality higher than a preset threshold, a logical channel with the largest logical channel identifier, a logical channel with the largest logical channel identifier among logical channels with channel quality higher than the preset threshold, or a logical channel with the smallest logical channel identifier among logical channels with channel quality higher than the preset threshold.

Optionally, the specific logical channel is one logical channel or multiple logical channels.

Optionally, the specific logical channel is a logical channel corresponding to the bearer configured by the network device, a logical channel under a Master Cell Group (MCG), or a logical channel under a Secondary Cell Group (SCG).

Optionally, the terminal device further includes a receiving unit 1320, configured to receive second indication information sent by the network device. The processing unit 1310 is specifically configured to determine a carrier allowed to be used by the at least one logical channel according to the second indication information.

Optionally, the terminal device further includes a receiving unit 1320, configured to receive a Radio Resource Control (RRC) message, wherein the RCC message includes a carrier allowed to be used by the at least one logical channel.

Optionally, the number of the at least one logical channel is the maximum number of logical channels supported by the bearer, or the number of logical channels for data duplication transmission configured by the network device for the terminal device, or the maximum number of logical channels that can be used for data duplication transmission configured by the network device for the terminal device, or the maximum number of logical channels supported by the terminal device, or the maximum number of logical channels corresponding to a bearer for data duplication transmission supported by the terminal device, or the number of logical channels for data duplication transmission corresponding to the bearer configured by the network device for the terminal device, or the maximum number of logical channels that can be used for data duplication transmission corresponding to the bearer configured by the network device for the terminal device.

Optionally, the terminal device further includes a receiving unit 1320, configured to receive uplink grant information; and a transmitting unit 1330, configured to use an uplink resource indicated by the uplink grant information to transmit data of a target logical channel among the at least one logical channel, wherein a carrier allowed to be used by the target logical channel matches a carrier where the uplink resource is located.

Optionally, the sending unit 1330 is specifically configured to: if channel quality on a carrier where the uplink resource is located meets a preset condition, send the data of the target logical channel by using the uplink resource.

Optionally, data of a logical channel which can be used when a function of data duplication transmission of the bearer is deactivated, can be transmitted on any carrier.

Optionally, the at least one logical channel is at least one logical channel after the number of activated logical channels corresponding to the bearer changes.

It should be understood that the terminal device 1300 may perform corresponding operations performed by a terminal device in the above method 900, which will not be repeated here for brevity.

Figure 14:
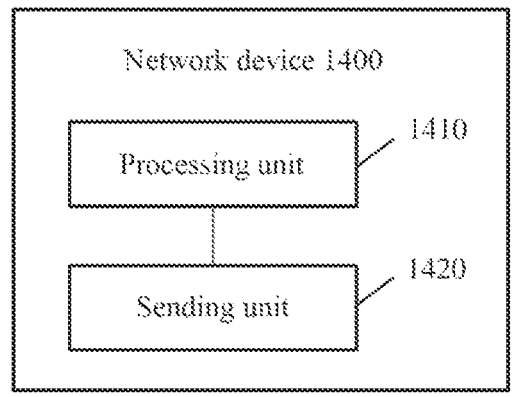
FIG. 14 is a schematic block diagram of a network device according to an implementation of the present disclosure.

FIG. 14 is a schematic block diagram of a network device 1400 in accordance with an implementation of the present disclosure. As shown in FIG. 14, the network device 1400 includes a processing unit 1410 and a sending unit 1420.

The processing unit 1410 is configured to generate first indication information.

The sending unit 1420 is configured to send first indication information, wherein the first indication information is used to indicate whether data of at least one logical channel of a terminal device can be transmitted using an uplink resource indicated by uplink grant information received by the terminal device.

Therefore, a network device sends first indication information to a terminal device to indicate whether data of each activated logical channel can be transmitted using a current uplink resource, so that when an activation/deactivation state of a logical channel changes, a carrier resource can still be effectively used to transmit data of each logical channel.

Optionally, the first indication information is carried in DCI, an RRC message, or a MAC CE.

Optionally, the first indication information and the uplink grant information are carried in the same message.

Optionally, the logical channel is a logical channel corresponding to a bearer configured with or without a function of data duplication transmission, or a logical channel corresponding to a bearer with an activated or deactivated function of data duplication transmission.

Optionally, the first indication information includes a logical channel identifier of a logical channel that can use the uplink resource to transmit data of the logical channel, or includes a logical channel identifier of a logical channel that cannot use the uplink resource to transmit data of the logical channel.

Optionally, the first indication information includes multiple bits, wherein each bit corresponds to one logical channel, and a value of each bit indicates whether data of a logical channel corresponding to each bit can be transmitted using the uplink resource.

Optionally, the number of the at least one logical channel is: the maximum number of logical channels supported by one bearer; or, the maximum number of logical channels supported by one bearer of the terminal device; or, the maximum number of logical channels corresponding to one bearer configured by the network device for the terminal device; or, the total number of logical channels corresponding to all bearers configured by the network device for the terminal device.

Optionally, the number of the at least one logical channel is: the number of logical channels corresponding to all bearers corresponding to a cell group (CG) configured by the network device for the terminal device; or, the number of all logical channels under one CG configured by the network device for the terminal device; or, the maximum number of logical channels under one CG configured by the network device for the terminal device; or, the maximum number of logical channels supported by the terminal device in a CG.

Optionally, the first indication information is dedicated indication information for the terminal device or common indication information for multiple terminal devices.

Optionally, the sending unit 1420 is further configured to send a Radio Resource Control (RRC) message, wherein the RRC message includes information of a carrier allowed to be used by the at least one logical channel.

It should be understood that the network device 1400 may perform corresponding operations performed by a network device in the above method 600, which will not be repeated here for brevity.

Figure 15:
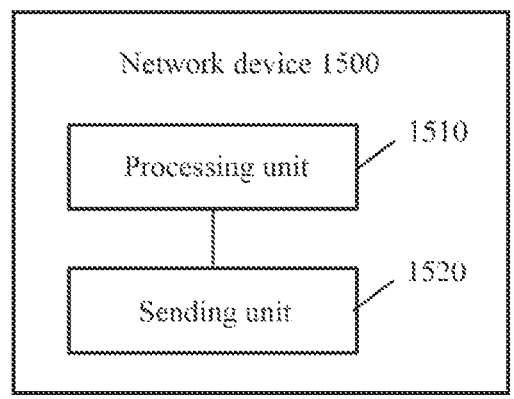
FIG. 15 is a schematic block diagram of a network device according to another implementation of the present disclosure.

FIG. 15 is a schematic block diagram of a network device 1500 in accordance with an implementation of the present disclosure. As shown in FIG. 15, the network device 1500 includes a processing unit 1510 and a sending unit 1520.

The processing unit 1510 is configured to generate first configuration information, wherein the first configuration information is used to indicate carriers allowed to be used by multiple logical channel sets corresponding to a bearer of a terminal device, wherein each logical channel set includes at least part of logical channels corresponding to the bearer.

The sending unit 1520 is configured to send the first configuration information.

Therefore, a network device configures carriers allowed to be used respectively for multiple logical channel sets corresponding to a bearer of a terminal device, so that when logical channels in a logical channel set are activated or used, the terminal device can know carriers allowed to be used by these logical channels, so as to carry out data transmission.

Optionally, numbers of logical channels in different logical channel sets are different, and/or logical channel identifiers of logical channels in different logical channel sets are different.

Optionally, carriers allowed to be used by logical channel sets with the same number of logical channels are the same or different.

Optionally, carriers allowed to be used by logical channel sets with different numbers of logical channels are the same or different.

Optionally, the multiple logical channel sets include a first logical channel set and a second logical channel set, carriers allowed to be used by at least one logical channel in the first logical channel set are the same as carriers allowed to be used by at least one logical channel in the second logical channel set, wherein the number of logical channels in the first logical channel set is the same as or different from that in the second logical channel set.

It should be understood that the network device 1500 may perform corresponding operations performed by a network device in the above method 800, which will not be repeated here for brevity.

Figure 16:
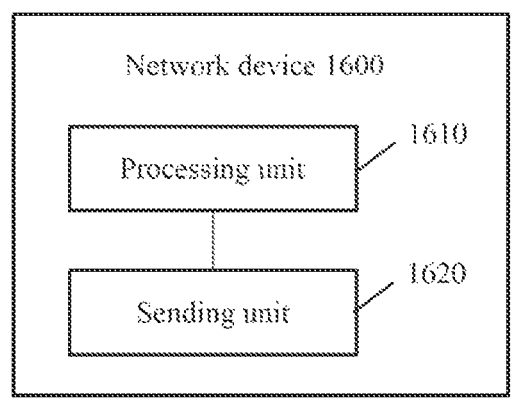
FIG. 16 is a schematic block diagram of a network device according to another implementation of the present disclosure.

FIG. 16 is a schematic block diagram of a network device 1600 according to an implementation of the present disclosure. As shown in FIG. 16, the network device 1600 includes a processing unit 1610 and a sending unit 1620.

The processing unit 1610 is configured to generate second indication information, wherein the second indication information is used to indicate a terminal device to determine a carrier allowed to be used by at least one logical channel corresponding to a bearer when the number of activated logical channels corresponding to the bearer changes.

The sending unit 1620 is configured to send the second indication information.

Therefore, when the number of activated logical channels corresponding to a bearer changes, the terminal device may re-determine a carrier allowed to be used by at least one logical channel corresponding to the bearer according to a preset rule, thereby effectively completing data transmission.

Optionally, the second indication information is specifically used to indicate to, if the activated logical channels corresponding to the bearer are changed from M logical channels to N logical channels and M is greater than N, use at least part of carriers allowed to be used by deactivated M-N logical channels as carders allowed to be used by at least part of the N logical channels, wherein M and N are positive integers.

Optionally, the second indication information is specifically used to indicate to, use at least part of the carriers allowed to be used by the deactivated M-N logical channels are taken as a part of carriers allowed to be used by a specific logical channel among the N logical channels; or, allocate evenly the carriers allowed to be used by the deactivated M-N logical channels to each logical channel among the N logical channels as a part of carriers allowed to be used by each logical channel among the N logical channels; or, allocate evenly the carriers allowed to be used by the deactivated M-N logical channels to K logical channels among the N logical channels as a part of carriers allowed to be used by each of the K logical channels. K≤N.

Optionally, the specific logical channel is any one of the N logical channels, or a logical channel which can be used when a function of data duplication transmission of the bearer is deactivated, or a primary logical channel configured by the network device for the terminal device, or a logical channel for transmitting Packet Data Convergence Protocol (PDCP) control Protocol Data Units (PDUs).

Optionally, the primary logical channel is a logical channel for transmitting PDCP control PDUs, or a logical channel which can be used when a function of data duplication transmission of the bearer is deactivated, or a primary logical channel under a Master Cell Group (MCG), a primary logical channel under a Secondary Cell Group (SCG), or a primary logical channel corresponding to the bearer.

Optionally, the specific logical channel is determined according to at least one of channel quality, a logical channel identifier, and a cell group (CG) identifier of the at least one logical channel.

Optionally, the specific logical channel is a logical channel with the best channel quality among the at least one logical channel, any logical channel among logical channels with channel quality higher than a preset threshold, a logical channel with the largest logical channel identifier, a logical channel with the largest logical channel identifier among logical channels with channel quality higher than the preset threshold, or a logical channel with the smallest logical channel identifier among logical channels with channel quality higher than the preset threshold.

Optionally, the specific logical channel is one logical channel or multiple logical channels.

Optionally, the specific logical channel is a logical channel corresponding to the bearer configured by the network device, a logical channel under a Master Cell Group (MCG), or a logical channel under a Secondary Cell Group (SCG).

Optionally, the sending unit 1620 is further configured to send a Radio Resource Control (RRC) message, wherein the RCC message includes a carrier allowed to be used by the at least one logical channel.

Optionally, the number of the at least one logical channel is the maximum number of logical channels supported by the bearer, or the number of logical channels for data duplication transmission configured by the network device for the terminal device, or the maximum number of logical channels that can be used for data duplication transmission configured by the network device for the terminal device, or the maximum number of logical channels supported by the terminal device, or the maximum number of logical channels corresponding to a bearer for data duplication transmission supported by the terminal device, or the number of logical channels for data duplication transmission corresponding to the bearer configured by the network device for the terminal device, or the maximum number of logical channels that can be used for data duplication transmission corresponding to the bearer configured by the network device for the terminal device.

Optionally, the at least one logical channel is at least one logical channel after the number of activated logical channels corresponding to the bearer changes.

It should be understood that the network device 1600 may perform corresponding operations performed by a network device in the above method 900, which will not be repeated here for brevity.

Figure 17:
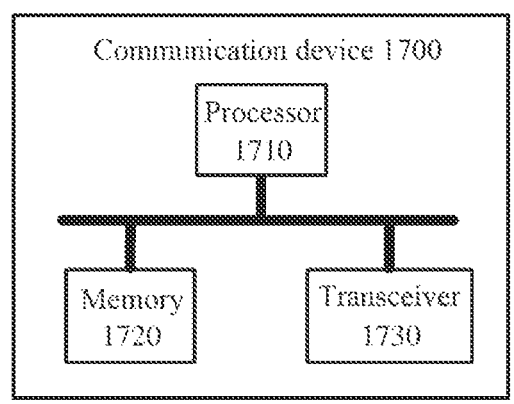
FIG. 17 is a schematic structural diagram of a communication device according to an implementation of the present disclosure.

FIG. 17 is a schematic diagram of a structure of a communication device 1700 of an implementation of the present disclosure. The communication device 1700 shown in FIG. 17 includes a processor 1710 that may call and run a computer program from a memory to implement the methods in the implementations of the present disclosure.

Optionally, as shown in FIG. 17, the communication device 1700 may further include a memory 1720. The processor 1710 may call and run the computer program from the memory 1720 to implement the methods in the implementations of the present disclosure.

The memory 1720 may be a separate device independent of the processor 1710 or may be integrated in the processor 1710.

Optionally, as shown in FIG. 17, the communication device 1700 may further include a transceiver 1730, and the processor 1710 may control the transceiver 1730 to communicate with another device. Specifically, the transceiver 630 may send information or data to another device, or receive information or data sent by another device.

The transceiver 1730 may include a transmitter and a receiver. The transceiver 1730 may further include antennas, and the number of the antennas may be one or more.

Optionally, the communication device 1700 may specifically be the terminal device of the implementations of the present disclosure, and the communication device 1700 may implement the corresponding processes implemented by the terminal device in various methods of the implementations of the present disclosure, which will not be repeated here for brevity.

Optionally, the communication device 1700 may specifically be the network device in the implementations of the present disclosure, and the communication device 1700 may implement the corresponding processes implemented by the network device in various methods in accordance with the implementations of the present disclosure, which will not be repeated herein for brevity.

Figure 18:
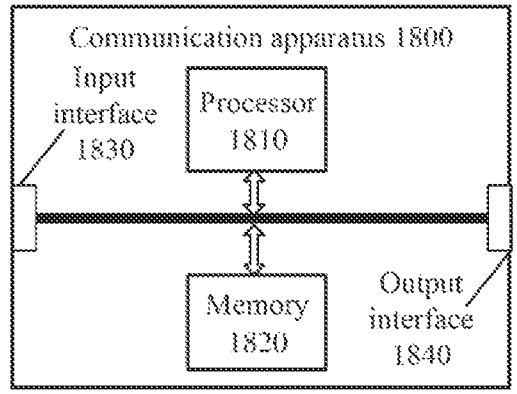
FIG. 18 is a schematic structural diagram of a communication apparatus according to an implementation of the present disclosure.

FIG. 18 is a schematic diagram of a structure of an apparatus based on data duplication transmission of an implementation of the present disclosure. The apparatus 1800 shown in FIG. 18 includes a processor 1810. The processor 1810 may call and run a computer program from a memory to implement the methods in the implementations of the present disclosure.

Optionally, as shown in FIG. 18, the apparatus 1800 may further include a memory 1820. The processor 1810 may call and run the computer program from the memory 1820 to implement the methods in the implementations of the present disclosure.

The memory 1820 may be a separate device independent of the processor 1810 or may be integrated in the processor 1810.

Optionally, the apparatus 1800 may further include an input interface 1830. The processor 1810 may control the input interface 1830 to communicate with another device or chip. Specifically, the processor 1810 may acquire information or data sent by another device or chip.

Optionally, the apparatus 1800 may further include an output interface 1840. The processor 1810 may control the output interface 1840 to communicate with another device or chip. Specifically, the processor 1810 may output information or data to another device or chip.

Optionally, the apparatus 1800 may be applied in a network device of the implementations of the present disclosure, and the communication device may implement the corresponding processes implemented by the network device in various methods of the implementations of the present disclosure, which will not be repeated herein for brevity.

Optionally, the apparatus 1800 may be applied in a terminal device in the implementations of the present disclosure, and the communication device may implement the corresponding processes implemented by the terminal device in various methods of the implementations of the present disclosure, which will not be repeated herein for brevity.

Optionally, the apparatus 1800 may be a chip. The chip may be a system-level chip, a system chip, a chip system, or a system-on-chip, etc.

The processor in the implementations of the present disclosure may be an integrated circuit chip having a signal processing capability. In an implementation process, each of the acts of the above method implementations may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, acts and logical block diagrams disclosed in the implementations of the present disclosure. The general purpose processor may be a microprocessor, or the processor may also be any conventional processor, or the like. The acts of the methods disclosed in the implementations of the present disclosure may be directly implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the acts of the above methods in combination with its hardware.

The memory in the implementations of the present disclosure may be a volatile memory or a non-volatile memory, or may include both a volatile memory and a non-volatile memory. The non-volatile memory may be a Read-Only Memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through as illustrative but not restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM).

It should be understood that the above memories are described as illustrative but not restrictive description. For example, a memory in an implementation of the present disclosure may be a static RAM (SRAM), a dynamic RAM (DRAM), a synchronous DRAM (SDRAM), a double Data Rate SDRAM (DDR SDRAM), an enhanced SDRAM (ESDRAM), a synch link DRAM (SLDRAM), a Direct Rambus RAM (DR RAM), or the like. That is, the memories in the implementations of the present disclosure are intended to include, but not be limited to, these and any other suitable type of memory.

Figure 19:
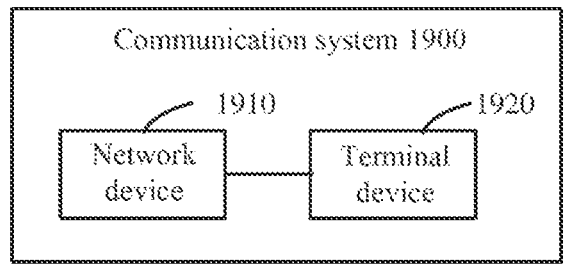
FIG. 19 is a schematic block diagram of a communication system according to an implementation of the present disclosure.

FIG. 19 is a schematic block diagram of a communication system 1900 according to an implementation of the present disclosure. As shown in FIG. 19, the communication system 1900 includes a network device 1910 and a terminal device 1920.

The network device 1910 is configured to send uplink grant information; and send first indication information.

The terminal device 1920 is configured to receive uplink grant information; and receive first indication information.

The first indication information is used to indicate whether data of at least one logical channel of the terminal device can be transmitted using an uplink resource indicated by the uplink grant information.

The network device 1910 may be configured to implement corresponding functions implemented by the network device in the method in FIG. 6, and a composition of the network device 1910 may be as shown in the network device 1400 in FIG. 14, which will not be repeated here for brevity.

The terminal device 1920 may be configured to implement corresponding functions implemented by the terminal device in the method in FIG. 6, and a composition of the terminal device 1920 may be as shown in the terminal device 1100 in FIG. 11, which will not be repeated here for brevity.

Figure 20:
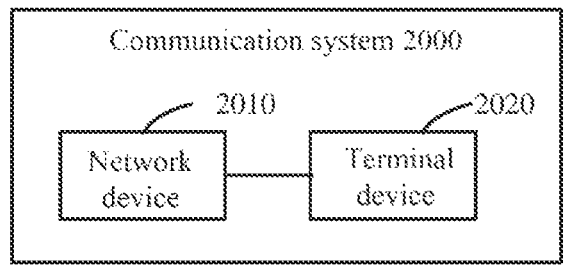
FIG. 20 is a schematic block diagram of a communication system according to another implementation of the present disclosure.

FIG. 20 is a schematic block diagram of a communication system 2000 according to an implementation of the present disclosure. As shown in FIG. 20, the communication system 2000 includes a network device 2010 and a terminal device 2020.

The network device 2010 is configured to send first configuration information.

The terminal device 2020 is configured to receive first configuration information; and according to the first configuration information, determine a carrier allowed to be used by an activated or used logical channel in a logical channel set.

The first configuration information is used to indicate carriers allowed to be used by multiple logical channel sets corresponding to a bearer, wherein each logical channel set includes at least part of logical channels corresponding to the bearer.

The network device 2010 may be configured to implement corresponding functions implemented by the network device in the method in FIG. 8, and a composition of the network device 2010 may be as shown in the network device 1500 FIG. 15, which will not be repeated here for brevity.

The terminal device 2020 may be configured to implement corresponding functions implemented by the terminal device in the method in FIG. 8, and a composition of the terminal device 2020 may be as shown in the terminal device 1200 in FIG. 12, which will not be repeated here for brevity.

Figure 21:
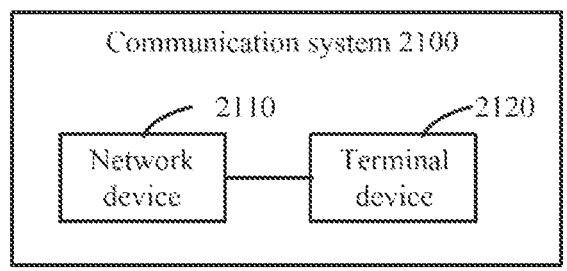
FIG. 21 is a schematic block diagram of a communication system according to another implementation of the present disclosure.

FIG. 21 is a schematic block diagram of a communication system 2100 according to an implementation of the present disclosure. As shown in FIG. 21, the communication system 2100 includes a network device 2110 and a terminal device 2120.

The network device 2110 is configured to send second indication information, wherein the second indication information is used to indicate a terminal device to determine a carrier allowed to be used by at least one logical channel corresponding to a bearer when the number of activated logical channels corresponding to the bearer changes.

The terminal device 2120 is configured to determine a carrier allowed to be used by at least one logical channel under a bearer when the number of activated logical channels corresponding to the bearer changes according to the second indication information.

The network device 2110 may be configured to implement corresponding functions implemented by the network device in the method in FIG. 9, and a composition of the network device 2110 may be as shown in the network device 1600 in FIG. 16, which will not be repeated here for brevity.

The terminal device 2120 may be configured to implement corresponding functions implemented by the terminal device in the method in FIG. 9, and a composition of the terminal device 2120 may be as shown in the terminal device 1300 in FIG. 13, which will not be repeated here for brevity.

An implementation of the present disclosure further provides a computer-readable storage medium configured to store a computer program. Optionally, the computer-readable storage medium may be applied in a terminal device in the implementations of the present disclosure, and the computer program causes a computer to perform the corresponding processes implemented by the terminal device in various methods of the implementations of the present disclosure, which will not be repeated herein for brevity. Optionally, the computer readable storage medium may be applied to a network device in the implementations of the present disclosure, and the computer program enables a computer to perform the corresponding processes implemented by a network device in various methods of the implementations of the present disclosure, which will not be repeated here for brevity.

An implementation of the present disclosure further provides a computer program product including computer program instructions. Optionally, the computer program product may be applied in a terminal device in the implementations of the present disclosure, and the computer program instructions cause a computer to perform the corresponding processes implemented by the terminal device in various methods of the implementations of the present disclosure, which will not be repeated herein for brevity. Optionally, the computer program product may be applied in a network device in the implementations of the present disclosure, and the computer program instructions enable a computer to perform the corresponding processes implemented by the network device in various methods of the implementations of the present disclosure, which will not be repeated herein for brevity.

An implementation of the present disclosure further provides a computer program. Optionally, the computer program may be applied to a terminal device in an implementation of the present disclosure, and when run on a computer, the computer program enables the computer to perform the corresponding processes implemented by the terminal device in various methods of the implementations of the present disclosure, which will not be repeated here for brevity. Optionally, the computer program may be applied to a network device in the implementations of the present disclosure. The computer program, when running on a computer, causes the computer to perform the corresponding processes implemented by the network device in various methods of the implementations of the present disclosure, which will not be described repeatedly for brevity.

The terms "system" and "network" in the implementations of the present disclosure are often used interchangeably herein. The term "and/or" herein describes an association relation between associated objects only, indicating that there may be three relations, for example, A and/or B may indicate three cases: A alone, both A and B, and B alone. In addition, the symbol "/" herein generally indicates that there is a "or" relation between the associated objects before and after "/".

In the implementations of the present disclosure, "B corresponding to (in correspondence to) A" means that B is associated with A, and B may be determined according to A. However, it should be further understood that determining B according to A does not mean that B is determined according to A only, and B may be determined according to A and/or other information.

Those of ordinary skill in the art will recognize that the example elements and algorithm acts described in combination with the implementations disclosed herein may be implemented in form of electronic hardware, or a combination of computer software and electronic hardware. Whether these functions are implemented in form of hardware or software depends on the specific application and design constraints of the technical solution. Those skilled in the art may use different methods to implement the described functions for each particular application, but such implementation should not be considered to be beyond the scope of the present disclosure.

Those skilled in the art may clearly understand that for convenience and conciseness of description, the specific working processes of the systems, apparatuses and units described above may be described with reference to the corresponding processes in the above method implementations and will not be repeated herein.

In several implementations provided by the present disclosure, it should be understood that the disclosed systems, devices and methods may be implemented in other ways. For example, the apparatus implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection between apparatuses or units through some interfaces, or may be in electrical, mechanical or in other forms.

A unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if achieved in a form of software functional units and sold or used as a separate product, may be stored in a computer-readable storage medium. Based on such understanding, the technical solution of the present disclosure, in essence, or the part contributing to the prior art, or the part of the technical solution, may be embodied in the form of a software product stored in a storage medium, including a number of instructions for enabling a computer device (which may be a personal computer, a server, or a network device, etc.) to perform all or part of the acts of the methods described in various implementations of the present disclosure. The aforementioned storage medium includes: a medium that is capable of storing program codes, such as a USB flash drive, a removable hard disk, a Read-Only Memory (ROM), a Random Access Memory (RAM), a magnetic disk, or an optical disk.

What are described above are merely specific implementation modes of the present disclosure, but the protection scope of the present disclosure is not limited thereto. Any variation or substitution that may be easily conceived by a person familiar with the art within the technical scope disclosed by the present disclosure shall be included within the protection scope of the present disclosure. Therefore, the protection scope of the present disclosure shall be subject to the protection scope of the claims.

The invention claimed is:

1. A method based on data duplication transmission, comprising:
 receiving, by a terminal device, uplink grant information; and
 receiving, by the terminal device, first indication information, wherein the first indication information is used for indicating whether data of at least one logical channel of the terminal device is capable of being transmitted by using an uplink resource indicated by the uplink grant information;
 sending, by the terminal device, data of a target logical channel in the at least one logical channel by using the uplink resource, wherein a carrier allowed to be used by the target logical channel matches a carrier where the uplink resource is located;

wherein the first indication information comprises a logical channel identifier of a logical channel capable of using the uplink resource to transmit data of the logical channel, and a logical channel identifier of a logical channel not capable of using the uplink resource to transmit data of the logical channel.

2. The method of claim 1, wherein the first indication information is carried in Downlink Control Information (DCI), a Radio Resource Control (RRC) message, or a Medium Access Control Control Element (MAC CE).

3. The method of claim 1, further comprising:

receiving, by the terminal device, a Radio Resource Control (RRC) message, wherein the RRC message comprises information of the carrier allowed to be used by the at least one logical channel.

4. A terminal device, comprising: a processor and a transceiver, wherein the transceiver is configured to receive uplink grant information; and to receive first indication information, wherein the first indication information is used for indicating whether data of at least one logical channel of the terminal device is capable of being transmitted using an uplink resource indicated by the uplink grant information;

wherein the transceiver is further configured to send data of s target logical channel in the at least one logical channel by using the uplink resource, wherein a carrier allowed to be used by the target logical channel matches s carrier where the uplink resource is located;

wherein the first indication information comprises s logical channel identifier of a logical channel capable of using the uplink resource to transmit data of the logical channel, and a logical channel identifier of a logical channel not capable of using the uplink resource to transmit data of the logical channel.

5. The terminal device of claim 4, wherein the first indication information is carried in Downlink Control Information (DCI), a Radio Resource Control (RRC) message, or a Medium Access Control Control Element (MAC CE).

6. The terminal device of claim 4, wherein the transceiver is further configured to:

receive a Radio Resource Control (RRC) message, wherein the RRC message comprises information of the carrier allowed to be used by the at least one logical channel.

7. A network device, comprising: a processor and a transceiver, wherein the processor is configured to generate first indication information; and the transceiver is configured to send first indication information, wherein the first indication information is used to indicate whether data of at least one logical channel of a terminal device is capable of being transmitted using an uplink resource indicated by uplink grant information received by the terminal device;

wherein the transceiver is further configured to receive data of a target logical channel in the at least one logical channel sent by the terminal device using the uplink resource, wherein a carrier allowed to be used by the target logical channel matches a carrier where the uplink resource is located;

wherein the first indication information comprises s logical channel identifier of a logical channel capable of using the uplink resource to transmit data of the logical channel, and a logical channel identifier of a logical channel not capable of using the uplink resource to transmit data of the logical channel.

8. The network device of claim 7, wherein the first indication information is carried in Downlink Control Information (DCI), a Radio Resource Control (RRC) message, or a Medium Access Control Control Element (MAC CE).

9. The network device of claim 7, wherein the transceiver is further configured to:

send a Radio Resource Control (RRC) message, wherein the RRC message comprises information of the carrier allowed to be used by the at least one logical channel.

* * * * *